United States Patent
Takeda et al.

(10) Patent No.: US 9,246,205 B2
(45) Date of Patent: Jan. 26, 2016

(54) TRANSMISSION OF SIGNALS VIA A HIGH-FREQUENCY WAVEGUIDE

(75) Inventors: Takahiro Takeda, Kanagawa (JP); Kenji Komori, Kanagawa (JP); Sho Ohashi, Kanagawa (JP); Yasuhiro Okada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 13/984,092

(22) PCT Filed: Feb. 13, 2012

(86) PCT No.: PCT/JP2012/053280
§ 371 (c)(1),
(2), (4) Date: Aug. 7, 2013

(87) PCT Pub. No.: WO2012/111617
PCT Pub. Date: Aug. 23, 2012

(65) Prior Publication Data
US 2013/0314182 A1    Nov. 28, 2013

(30) Foreign Application Priority Data

Feb. 18, 2011   (JP) ................................. 2011-033057
Jan. 30, 2012   (JP) ................................. 2012-016372

(51) Int. Cl.
*H01P 3/16* (2006.01)
*H04B 3/52* (2006.01)

(52) U.S. Cl.
CPC ... *H01P 3/16* (2013.01); *H04B 3/52* (2013.01)

(58) Field of Classification Search
CPC .......... H01P 3/16; H01P 3/165; H01P 11/001
USPC .......................................... 333/137, 248, 249
See application file for complete search history.

(56) References Cited

U.S. PATENT DOCUMENTS

| 4,490,700 | A | * | 12/1984 | Stern et al. | 333/258 |
| 8,358,185 | B2 | * | 1/2013 | Ohno et al. | 333/254 |
| 2010/0244991 | A1 | * | 9/2010 | Washiro | 333/219 |
| 2010/0301965 | A1 | * | 12/2010 | Peschke et al. | 333/137 |
| 2012/0013421 | A1 | * | 1/2012 | Hayata | 333/239 |

FOREIGN PATENT DOCUMENTS

| CN | 101145810 A | 3/2008 |
| CN | 101187972 A | 5/2008 |
| JP | 2003-324395 | 11/2003 |
| JP | 2006-190215 | 7/2006 |
| JP | 2008-099235 | 4/2008 |
| JP | 2008-131372 | 6/2008 |

OTHER PUBLICATIONS

Chinese Office Examination issued in connection with related counterpart Chinese patent application No. CN201280006163.X dated Apr. 30, 2014.

* cited by examiner

*Primary Examiner* — John Poos
(74) *Attorney, Agent, or Firm* — Dentons US LLP

(57) ABSTRACT

A signal transmission device comprises a high-frequency signal waveguide. The high-frequency signal waveguide is configured to transmit a high-frequency signal emitted from an electronic device. When the electronic device is at least proximate to a flat surface of the high-frequency signal waveguide, the high-frequency signal is directly coupled from the electronic device to the high-frequency signal waveguide and transmitted via the high-frequency signal waveguide.

16 Claims, 16 Drawing Sheets

FIG. 6
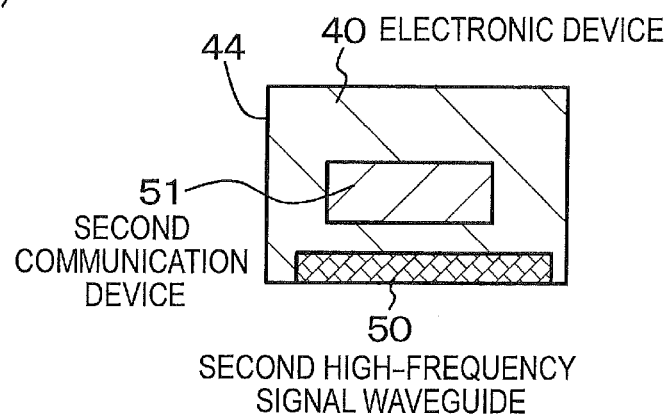
(A)
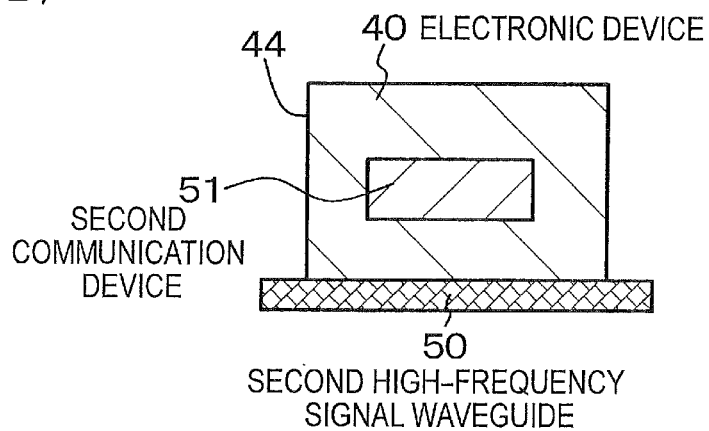
(B)

FIG. 8
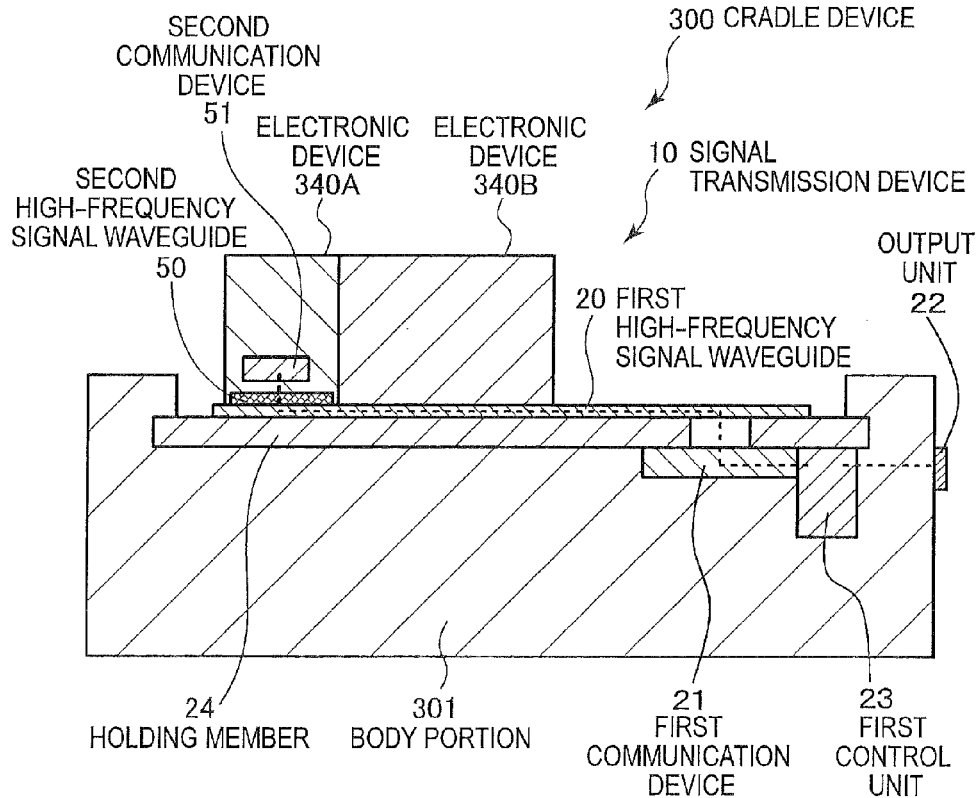
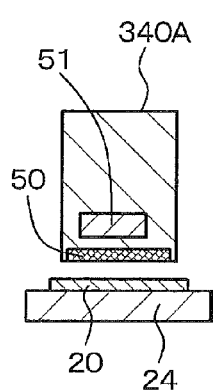 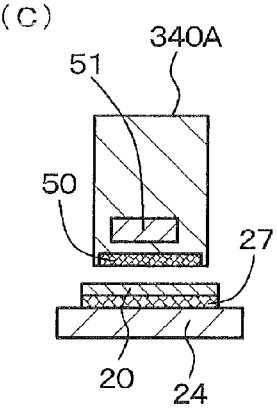 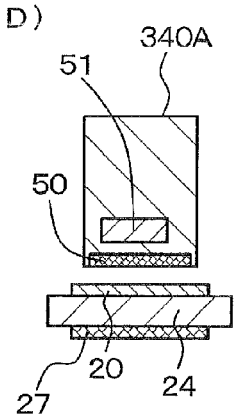

FIG. 22
(A) (CONVENTIONAL EXAMPLE)
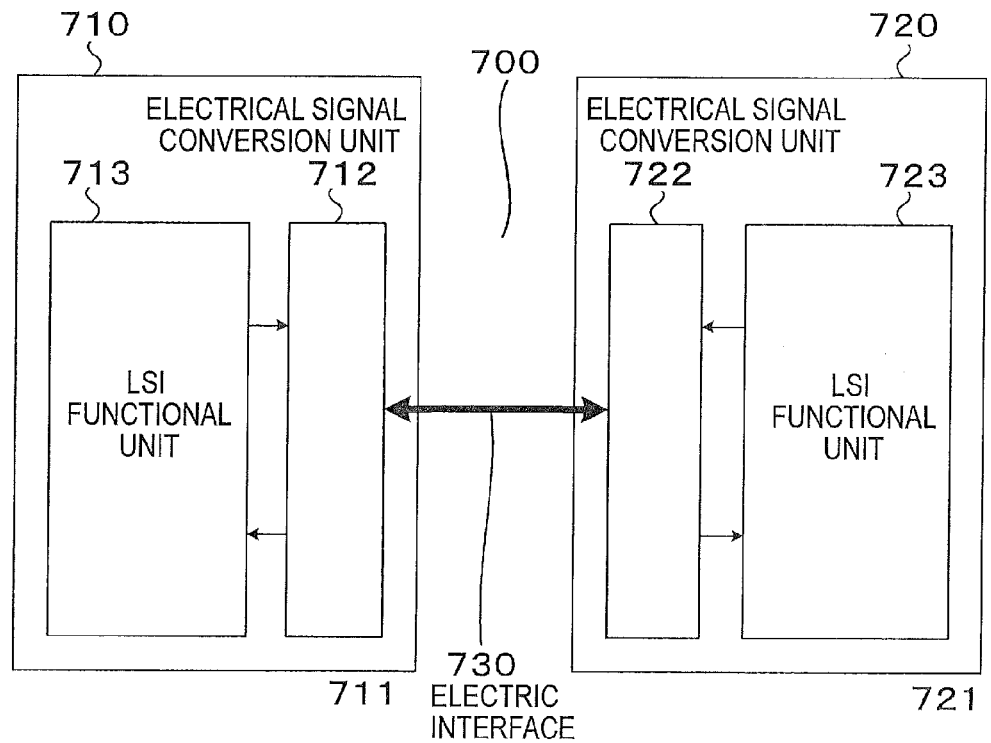
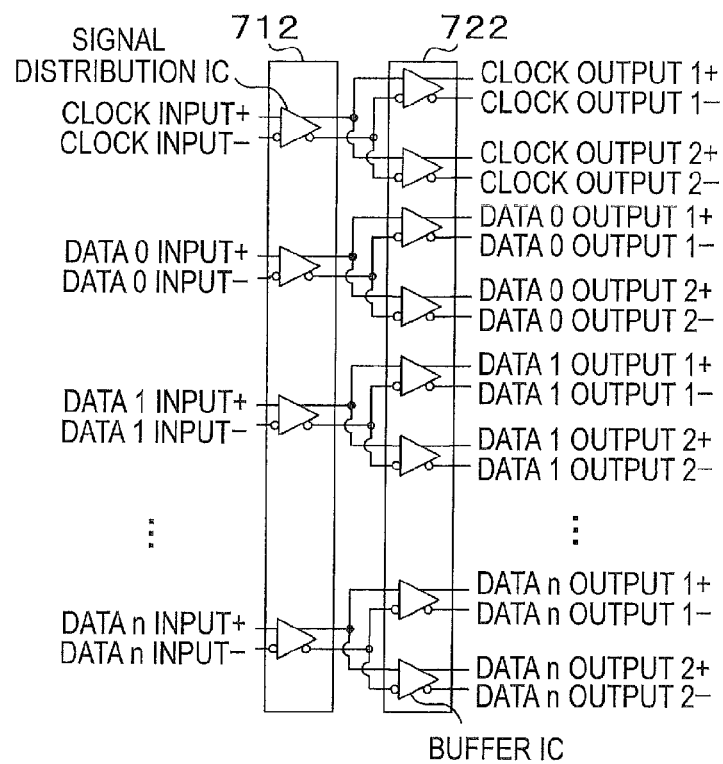

TRANSMISSION OF SIGNALS VIA A HIGH-FREQUENCY WAVEGUIDE

TECHNICAL FIELD

The present disclosure relates to a signal transmission device and an electronic device.

BACKGROUND ART

When information/data is exchanged or transmitted/received between electronic devices, the electronic devices are normally connected by a cable. For example, when data such as images, music or the like is exchanged or transmitted/received between electronic devices such as computer apparatuses, the electronic devices may be connected by a general-purpose cable such as an AV (Audio Visual) cable, USB cable or the like. Alternatively, information/data may be exchanged or transmitted/received between electronic devices by using a wireless interface of wireless LAN, typified by IEEE802.11, or the like.

In addition, technology of performing data communication by using a mount that sends out a high-frequency signal as a static electromagnetic field is known from Japanese Patent Application Laid-Open Publication No. 2008-099235 or Japanese Patent Application Laid-Open Publication No. 2008-131372. More specifically, a communication system disclosed by Japanese Patent Application Laid-Open Publication No. 2008-099235 or Japanese Patent Application Laid-Open Publication No. 2008-131372 includes a transmitter having a transmission circuit unit that generates a high-frequency signal transmitting data and a mount that sends out the high-frequency signal as a static electromagnetic field and a receiver having the mount and a reception circuit unit that performs reception processing of the high-frequency signal received by the mount and further includes a surface wave transmission means that provides a surface wave transmission line that transmits a surface wave radiated from the mount in the transmitter with a low loss (Japanese Patent Application Laid-Open Publication No. 2008-099235) or a coupler having at least one transmitter-side mount to receive the high-frequency signal output from the mount by electrostatically coupling to the mount in the transmitter, a signal line that transmits the received high-frequency signal, and at least one receiver-side mount to output the high-frequency signal having been transmitted through the signal line by electrostatically coupling to the mount in the receiver (Japanese Patent Application Laid-Open Publication No. 2008-131372).

CITATION LIST

Patent Literature

Patent Literature 1: Japanese Patent Application Laid-Open Publication No. 2008-099235
Patent Literature 2: Japanese Patent Application Laid-Open Publication No. 2008-131372

SUMMARY OF INVENTION

Technical Problem

Connecting electronic devices by using a general-purpose cable is complicated and the cable is often troublesome. Connectors are used for connection by using a general-purpose cable and such connectors may have a reliability problem, making low-price system construction difficult. While the technologies disclosed in the above patent gazettes are excellent technologies, a strong demand for further reduction of power consumption and also a strong demand for a wider communication range and a higher transmission rate exist.

Therefore, an object of the present disclosure is to provide a signal transmission device allowing low-price system construction and capable of exchanging data between electronic devices without connecting a general-purpose cable therebetween and achieving a further reduction of power consumption, a wider communication range, and a higher transmission rate and an electronic device including the signal transmission device.

Solution to Problem

In order to achieve the above object, according to the present disclosure, there is provided a signal transmission device including a high-frequency signal waveguide that transmits a high-frequency signal emitted from an electronic device. When the electronic device is arranged close to the high-frequency signal waveguide, the high-frequency signal is transmitted via the high-frequency signal waveguide.

In order to achieve the above object, according to the present disclosure, there is provided an electronic device including a communication device, and a high-frequency signal waveguide that transmits a high-frequency signal emitted from the communication device. When the high-frequency signal waveguide is arranged close to a high-frequency signal waveguide disposed outside, the high-frequency signal is transmitted from the high-frequency signal waveguide included in the electronic device to the high-frequency signal waveguide disposed outside.

Advantageous Effects of Invention

A signal transmission device of the present disclosure includes a high-frequency signal waveguide and transmits a high-frequency signal as data emitted from a close electronic device via the high-frequency signal waveguide. An electronic device of the present disclosure includes a high-frequency signal waveguide and when the high-frequency signal waveguide is arranged close to a high-frequency signal waveguide disposed outside, a high-frequency signal as data is transmitted from the high-frequency signal waveguide constituting the electronic device to the high-frequency signal waveguide disposed outside. Therefore, data can be exchanged between electronic devices without connecting a general-purpose cable therebetween, the degree of freedom of arranging electronic devices is high, and power consumption does not increase. Moreover, a signal to be transmitted (called a "transmission intended signal" for convenience sake) is converted into a high-frequency signal before transmission and thus, a wide communication range and a high transmission rate can be achieved. Further, coupling is good, the transmission loss is small, the reflection of a high-frequency signal in the signal transmission device and electronic devices can be suppressed, multipaths and unnecessary radiation can be reduced at high transmission rate, and also transmission degradation can be suppressed. In addition, confidentiality of information (data) is high because a high-frequency signal can be confined to within the high-frequency signal waveguide.

BRIEF DESCRIPTION OF DRAWINGS

[FIG. 6] (A) and (B) of FIG. 6 are conceptual diagrams of another modification of the electronic device according to Example 2.

FIG. 7 is a block diagram of a first communication device and a second communication device according to Example 1 or Example 2.

[FIG. 8] (A) of FIG. 8 is a schematic diagram of the signal transmission device and the electronic device according to Example 3 and (B) to (D) of FIG. 8 are schematic sectional views of the signal transmission device according to Example 3.

FIG. 9 is a schematic diagram of the signal transmission device and the electronic device according to Example 4.

FIG. 10 is a conceptual diagram of the signal transmission device and the electronic device according to Example 5 and shows an example in which a first high-frequency signal waveguide is formed of one flat plate.

FIG. 11 is a conceptual diagram of a modification of the signal transmission device and the electronic device according to Example 5 and shows an example in which the first high-frequency signal waveguide has a comb shape.

FIG. 12 is a conceptual diagram of the modification of the signal transmission device and the electronic device according to Example 5 and shows an example in which the first high-frequency signal waveguide has the comb shape.

FIG. 13 is a conceptual diagram of the modification of the signal transmission device and the electronic device according to Example 5 and shows an example in which the first high-frequency signal waveguide has the comb shape.

FIG. 14 is a conceptual diagram of the modification of the signal transmission device and the electronic device according to Example 5 and shows an example in which the first high-frequency signal waveguide has the comb shape.

FIG. 15 is a conceptual diagram of the modification of the signal transmission device and the electronic device according to Example 5 and shows an example in which the first high-frequency signal waveguide has the comb shape.

FIG. 16 is a conceptual diagram of the modification of the signal transmission device and the electronic device according to Example 5 and shows an example in which the first high-frequency signal waveguide has the comb shape.

FIG. 17 is a conceptual diagram of the modification of the signal transmission device and the electronic device according to Example 5 and shows an example in which the first high-frequency signal waveguide has the comb shape.

FIG. 18 is a conceptual diagram of the modification of the signal transmission device and the electronic device according to Example 5 and shows an example in which the first high-frequency signal waveguide has a lattice shape.

FIG. 19 is a conceptual diagram of the modification of the signal transmission device and the electronic device according to Example 5 and shows an example in which the first high-frequency signal waveguide has a spiral shape.

FIG. 20 is a conceptual diagram of the modification of the signal transmission device and the electronic device according to Example 5 and shows an example in which the first high-frequency signal waveguide has a cubic shape.

FIG. 21 is a conceptual diagram of an example in which the electronic device is formed of a multilayer printed wiring board.

[FIG. 22] (A) and (B) of FIG. 22 are a conceptual diagram of a conventional signal transmission device and a conceptual diagram of an electric interface respectively.

DESCRIPTION OF EMBODIMENTS

Figure 1:
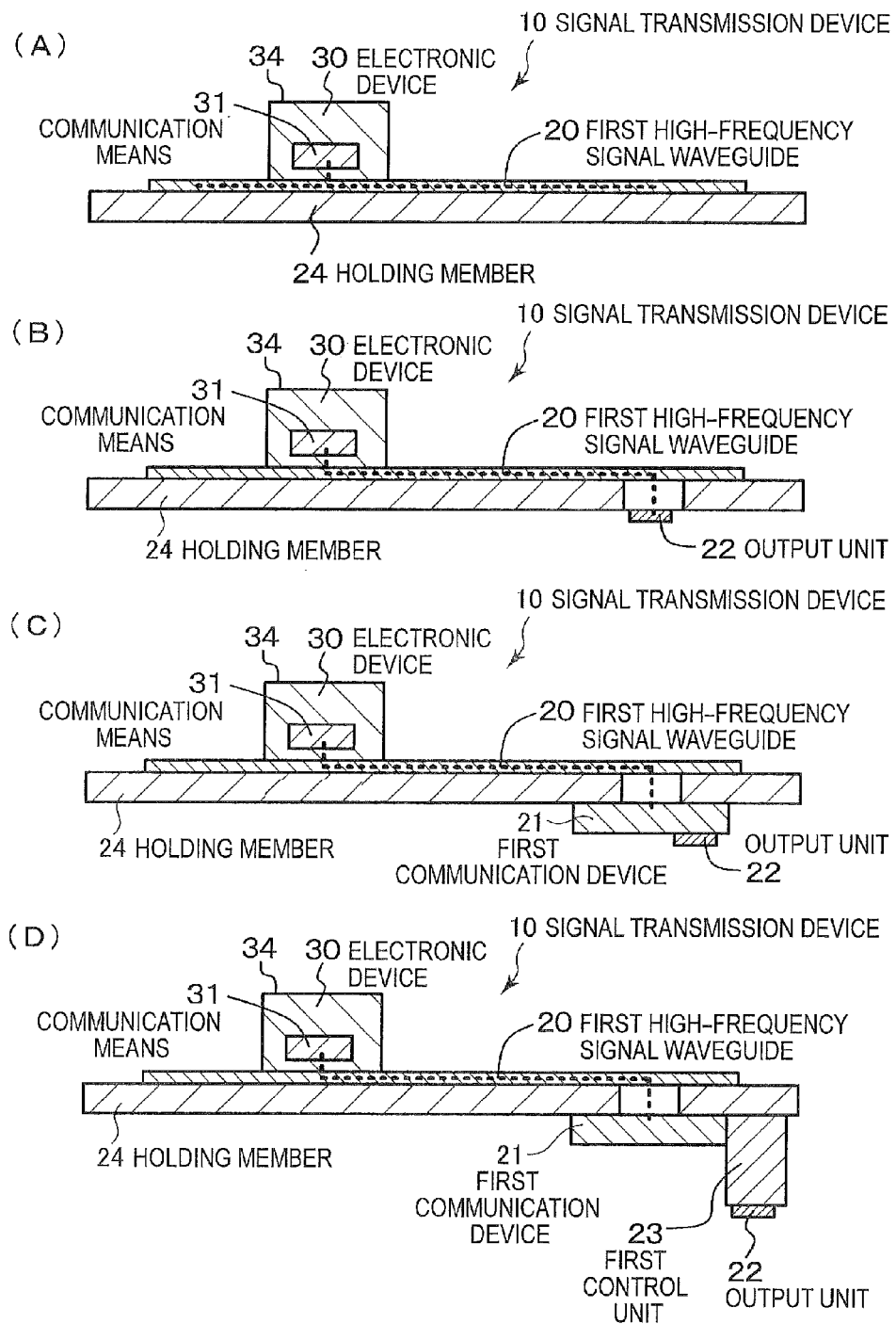
[FIG. 1] (A) to (D) of FIG. 1 are conceptual diagrams of a signal transmission device according to Example 1.

The following is a description of examples of the present disclosure with reference to the accompanying drawings. However, the present disclosure is not limited to those examples, and various numerical values and materials in the examples are merely examples. The description will be provided in the following order.

1. Description of Signal transmission device and Electronic Device of Present Disclosure in General
2. Example 1 (Signal transmission device of Present Disclosure)
3. Example 2 (Signal transmission device of Present Disclosure and Electronic Device of Present Disclosure)
4. Example 3 (Modification of Example 1 and Example 2)
5. Example 4 (Another Modification of Example 1 and Example 2)
6. Example 5 (Still Another Modification of Example 1 and Example 2)

Description of Signal transmission device and Electronic Device of Present Disclosure in General To make a sharp distinction between a high-frequency signal waveguide in an electronic device of the present disclosure and a high-frequency signal waveguide disposed outside, the high-frequency signal waveguide disposed outside may be called a "first high-frequency signal waveguide" for convenience sake and the high-frequency signal waveguide in the electronic device of the present disclosure may be called a "second high-frequency signal waveguide" for convenience sake. The high-frequency signal waveguide (first high-frequency signal waveguide) disposed outside the electronic device of the present disclosure can be configured from the high-frequency signal waveguide in a signal transmission device of the present disclosure. Therefore, the high-frequency signal waveguide in the signal transmission device of the present disclosure may be called the "first high-frequency signal waveguide". To make a sharp distinction between a communication device in an electronic device of the present disclosure and a communication device in a signal transmission device of the present disclosure described later, the communication device in the signal transmission device of the present disclosure may be called a "first communication device" for convenience sake and the communication device in the electronic device of the present disclosure may be called a "second communication device"

The signal transmission device of the present disclosure can be configured so that, when a plurality of electronic devices is arranged close to the high-frequency signal waveguide, the high-frequency signal is transmitted between the plurality of electronic devices via the high-frequency signal waveguide. By performing high-frequency signal transmission between the plurality of electronic devices via the high-frequency signal waveguide as described above, some electronic device (called an "electronic device-B" for convenience sake) can be regarded as an external device or additional device of another electronic device (called an "electronic device-A" for convenience sake) and the electronic device-B can be used as an electronic device to extend the function of the electronic device-A. That is, the functional extension or functional changes of the electronic device-A can be made without changing the electronic device-A itself In other words, the functional extension or functional changes of the electronic device-A can be made by indirectly combining with the electronic device-B without changing, for example, the design of the electronic device-A or changing the printed wiring board or various parts constituting the electronic device-A. In addition, the degree of freedom of combining the electronic device-A and the electronic device-B is extremely high and the combination of electronic devices can easily be changed.

The signal transmission device of the present disclosure including the above preferred mode can be configured to further include a communication device (first communication device) connected to a high-frequency signal waveguide or coupled to a high-frequency signal waveguide, wherein, when the electronic device is arranged close to the high-frequency signal waveguide, the high-frequency signal as data is transmitted between the communication device (first communication device) and the electronic device via the high-frequency signal waveguide.

Further, the signal transmission device of the present disclosure including the preferred mode described above can be configured to further include a holding member that holds (a support member that supports) the high-frequency signal waveguide, wherein the high-frequency signal waveguide is arranged inside the holding member. In this case, for example, an electronic device may be placed on, brought into contact with, or caused to approach a portion of the holding member facing the high-frequency signal waveguide. Here, "close" includes "placement", "contact", and "approach". "Causing to approach" means being in a non-contact state. This also applies below. Because the holding member is present between the high-frequency signal waveguide and electronic device in this case, it is preferable to make transmission power of the first communication device or the second communication device larger than in a configuration described below in which the high-frequency signal waveguide and electronic device are in contact. To clarify the position where an electronic device should be placed, for example, a recess to place an electronic device may be provided or an appropriate mark may be attached to a portion of the holding member facing the high-frequency signal waveguide.

Alternatively, the signal transmission device of the present disclosure including the preferred mode described above can be configured to further include a holding member that holds (a support member that supports) the high-frequency signal waveguide, wherein at least a portion of the high-frequency signal waveguide is exposed from the holding member. In this case, for example, an electronic device may be placed on, brought into contact with, or caused to approach a portion of the high-frequency signal waveguide exposed from the holding member. Alternatively, the signal transmission device of the present disclosure can be configured to further include a holding member that holds (a support member that supports) the high-frequency signal waveguide, wherein the high-frequency signal waveguide is formed on the holding member.

In this case, for example, an electronic device may be placed on, brought into contact with, or caused to approach the high-frequency signal waveguide. Incidentally, these configurations are preferably a configuration in which when an electronic device is arranged close to the high-frequency signal waveguide, the electronic device and the waveguide are coupled by a vertically polarized electromagnetic wave.

Further, the signal transmission device of the present disclosure including the preferred mode/configuration described above can be configured so that the high-frequency signal waveguide has a flat-plate shape, a comb shape, a lattice shape, or a spiral shape. By adopting a comb shape or spiral shape as the shape of the high-frequency signal waveguide, the width of the waveguide can be adjusted so that a structure with good coupling and less transmission loss can be achieved. By adopting a lattice shape as the shape of the high-frequency signal waveguide, because a plurality of paths (transmission paths of a high-frequency signal in the high-frequency signal waveguide and this also applies below) is formed, where in the high-frequency signal waveguide an electronic device is placed can be detected based on a time difference between high-frequency signals transmitted in the high-frequency signal waveguide. By adopting a spiral shape as the shape of the high-frequency signal waveguide, a structure with less transmission loss can be achieved without a portion where the high-frequency signal waveguide is bent at right angles and the influence of multipaths can be reduced because of the single transmission line. Thus, the high-frequency signal waveguide as a whole may be constructed as a two-dimensional structure or as a linear or curved (one-dimensional) structure, but is not limited to such structures and may be constructed as a three-dimensional (cubic) structure as a whole. To construct a high-frequency signal waveguide as a three-dimensional structure, a plurality of two-dimensional high-frequency signal waveguides may be placed side by side and connected by, for example, a waveguide.

Further, the signal transmission device of the present disclosure including the preferred mode/configuration described above can be configured so that a layer formed from a material that is different from the material constituting the high-frequency signal waveguide is formed above the high-frequency signal waveguide, below the high-frequency signal waveguide, or above and below the high-frequency signal waveguide. That is, the high-frequency signal waveguide may have a structure in which a plurality of layers are laminated. Alternatively, a conductive layer may be formed between the holding member and high-frequency signal waveguide or a laminated structure of the high-frequency signal waveguide, holding member, and conductive layer may be adopted. A material constituting the holding member described layer can be cited as a material constituting a layer formed from a material that is different from the material constituting the high-frequency signal waveguide, a metal or alloy can be cited as a material constituting the conductive layer, and the conductive layer can be formed based on, for example, the electroplating method, printing method, a combination of the physical vapor deposition method (PVD method) or chemical vapor deposition method (CVD method) and the etching method the like.

Further, the signal transmission device of the present disclosure including the preferred mode/configuration described above can be configured so that the high-frequency signal waveguide is formed from a dielectric material, a magnetic material, or a ceramic material, glass material, and crystalline material. As the dielectric material, the PTFE (polytetrafluoroethylene) resin, polyethylene resin, polypropylene, resin, polystylene resin, bismaleimide-triazine resin (BT resin), epoxy resin, ABS resin, AES resin, and acrylic resin can be exemplified. Incidentally, it is preferable that the relative dielectric constant $\epsilon_1$ (for example, 3 to 10) of the material constituting the high-frequency signal waveguide and the relative dielectric constant $\epsilon_2$ of the material constituting the holding member be configured to be different. More specifically, though not limited, for example $$0.1 \leq |\epsilon_2 - \epsilon_1| \leq 10$$

can be exemplified. As the magnetic material, a spinel, hexagonal, or garnet ferritic magnetic material, iron oxide, chromium oxide, and cobalt can be exemplified. The high-frequency signal waveguide may be formed from a stiff material or flexible material.

In addition, the signal transmission device of the present disclosure including the preferred mode/configuration described above can be configured so that the high-frequency signal waveguide is fixed to the holding member by using a fixing member produced from metal alloy, plastics or the like, based on an adhesive, or based on various welding method or deposition methods or the high-frequency signal waveguide and holding member may integrally be produced.

An electronic device of the present disclosure can be configured to further include a high-frequency signal transmission member (called a "second high-frequency signal transmission member" for convenience sake) that transmits the high-frequency signal emitted from the communication device (second communication device) to the high-frequency signal waveguide (second high-frequency signal waveguide) constituting the electronic device. Here, an antenna can be cited as the second high-frequency signal transmission member. By including the second high-frequency signal transmission member, the limit of the distance between the second communication device and second high-frequency signal waveguide can be relaxed. That is, even if the distance between the second communication device and second high-frequency signal waveguide is great, a high-frequency signal (data) can reliably be exchanged between the second communication device and second high-frequency signal waveguide. When the second high-frequency signal waveguide and the second high-frequency signal transmission member are arranged, a considerable (a few mm to a few cm) error can be tolerated and high positional precision like high positional precision when a connector is disposed is not demanded. Moreover, electromagnetic wave losses can be reduced and therefore, lower power consumption of the second communication device and simplification of the second communication device can be achieved and also interference of radio waves from outside the electronic device and radiation of electromagnetic waves to the outside of the electronic device can be inhibited.

The configuration and structure of the high-frequency signal waveguide in a signal transmission device of the present disclosure described above can be applied to the high-frequency signal waveguide (second high-frequency signal waveguide) in an electronic device of the present disclosure. The "electronic device" in a signal transmission device of the present disclosure may be an electronic device having the same configuration and structure as those of the electronic device of the present disclosure, an electronic device having the same configuration and structure as those of the electronic device of the present disclosure except that the second high-frequency signal waveguide is not included, or an electronic device having a different configuration and structure as those of the electronic device of the present disclosure though a communication means is included. The signal transmission device can be configured to further include a high-frequency signal transmission member (called a "first high-frequency signal transmission member" for convenience sake) that transmits a high-frequency signal emitted from the first communication device to the first high-frequency signal waveguide, thereby relaxing the limit of the distance between the first communication device and first high-frequency signal waveguide. That is, even if the distance between the first communication device and first high-frequency signal waveguide is great, a high-frequency signal (data) can reliably be exchanged between the first communication device and first high-frequency signal waveguide.

When the first high-frequency signal transmission member or second high-frequency signal transmission member is formed from an antenna, concretely the patch antenna, inverted F antenna, Yagi antenna, probe antenna (dipole antenna and so on), loop antenna, and small aperture coupling element (slot antenna and so on) can be cited as the antenna. The first communication device and first high-frequency signal transmission member or the second communication device and second high-frequency signal transmission member can be connected or coupled via a transmission line formed of, for example, a micro strip line, strip line, coplanar line, slot line or the like.

The first high-frequency signal waveguide (may also be called the "first high-frequency signal transmission member") or the second high-frequency signal waveguide (may also be called the "second high-frequency signal transmission member") may be made, for example, a free space transmission line for transmission in a space inside the housing constituting a holding member or electronic device, but is preferably configured by a waveguide structure of a waveguide, transmission line, dielectric line, and internal dielectrics to confine an electromagnetic wave in the millimeter waveband within the transmission line and to have a property that high-frequency signal transmission is performed efficiently. When used as a free space transmission line, wireless transmission may be performed. The first high-frequency signal waveguide and second high-frequency signal waveguide may be, as described above, linear (one-dimensional), surface-shaped (two-dimensional), or three-dimensional. By appropriately selecting and deciding the relative dielectric constants of materials constituting the first high-frequency signal waveguide and second high-frequency signal waveguide, wavelength of a high-frequency signal transmitted by these waveguides, and width and thickness of the first high-frequency signal waveguide and second high-frequency signal waveguide, coupling based on the electromagnetic coupling/electric field between the first high-frequency signal waveguide and electronic device and coupling based on the electromagnetic coupling/electric field between the first high-frequency signal waveguide and second high-frequency signal waveguide particularly in single mode can be achieved.

The electronic device of the present disclosure including the preferred mode described above can be configured to further include a housing so that the second high-frequency signal waveguide is arranged inside the housing. In this case, a portion of the housing facing the second high-frequency signal waveguide may be placed on, brought into contact with, or caused to approach the holding member or the first high-frequency signal waveguide. Alternatively, the electronic device of the present disclosure can be configured to further include a housing so that at least a portion of the second high-frequency signal waveguide is exposed from the housing. In this case, a portion of the second high-frequency signal waveguide exposed from the housing may be placed on, brought into contact with, or caused to approach the holding member or the first high-frequency signal waveguide.

Alternatively, the electronic device of the present disclosure can be configured to further include a housing so that the second high-frequency signal waveguide is formed on the housing. In this case, the second high-frequency signal waveguide may be placed on, brought into contact with, or caused to approach the holding member or the first high-frequency signal waveguide.

In the electronic device of the present disclosure, an electronic device body portion and the second communication device and second high-frequency signal waveguide may integrally be accommodated in one housing or the electronic device body portion and the second communication device and second high-frequency signal waveguide may be accommodated in separate housings to connect the housing in which the electronic device body portion is accommodated and the housing in which the second communication device and second high-frequency signal waveguide are accommodated by an appropriate connection member.

As the material constituting the holding member or the material of the housing constituting the ,signal transmission device or electronic device, plastics, metal, alloy, wood, and paper can be exemplified and more specifically, for example, PTFE (polytetrafluoroethylene) resin, polyethylene resin, polypropylene, resin, polystyrene resin, bismaleimide-triazine resin (BT resin), epoxy resin, ABS resin, AES resin, acrylic resin, aluminum, magnesium, iron, and stainless steel can be exemplified. The housing and holding member constituting the signal transmission device may be integrated.

The signal transmission device may include a control unit (called a "first control unit" for convenience sake) for control of the signal transmission device and/or control of the electronic device. In addition, the electronic device may include a control unit (called a "second control unit" for convenience sake) for control of the signal transmission device and/or control of the electronic device.

Alternatively, a control unit for control of the signal transmission device and/or control of the electronic device may be disposed outside the apparatus (apparatus other than the signal transmission apparatus and electronic device). Such a control unit is called a "external control unit" for convenience sake. When, for example, a new electronic device is arranged close to the first high-frequency signal waveguide of the signal transmission device, the first control unit, second control unit, or external control unit manages electronic device configuration information before and after the arrangement and can transmit a high-frequency signal according to the changed electronic device configuration information. Alternatively, when a high-frequency signal as data is transmitted between a plurality of electronic devices via the first high-frequency signal waveguide and the combination of the plurality of electronic devices is changed or a new electronic device is added, the first control unit, second control unit, or external control unit can perform the high-frequency signal transmission in a state suited to the changed combination. As processing to perform high-frequency signal transmission according to electronic device configuration information or to perform high-frequency signal transmission in a state suited to the changed combination, for example, adjustments of the frequency or transmission/reception power in accordance with the changed type of electronic devices can be exemplified. An electronic device, signal transmission device, or external apparatus may be caused to store the electronic device configuration information and more specifically, as the electronic device configuration information, the frequency used, transmission power value, and reception power value of the electronic device can be exemplified. Which processing to perform based on electronic device configuration information may be stored in the first control unit, second control unit, or external control unit as a kind of database.

The first control unit can be configured to detect the location of the first high-frequency signal waveguide where an electronic device is arranged. Alternatively, the first control unit can also be configured to detect whether an object arranged close to the first high-frequency signal waveguide is an electronic device or foreign object (object other than an electronic device). Alternatively, the first control unit may normally place the first communication device or second communication device in power saving mode so that when communication processing becomes necessary, that is, the first control unit detects that an electronic device is arranged close to the first high-frequency signal waveguide, processing to switch from the power saving mode to the normal operation mode is performed.

When an electronic device needs feeding, feeding (power transmission) to the electronic device can be performed based on wireless feeding of the radio receiving method, electromagnetic induction method, or resonance method. In this case, though dependent on the feeding method or the frequency band of a high-frequency signal, feeding can be performed via the first high-frequency signal waveguide or via the first high-frequency signal waveguide and the second high-frequency signal waveguide. When wireless feeding is performed, feeding (power transmission) and high-frequency signal transmission may be performed by mutually different signals and in such a case, the frequency of feeding and the frequency of a carrier signal for data transmission may be made different or the same. However, from the viewpoint of reducing the influence of noise and the like due to feeding, it is preferable to make the frequency of feeding and the frequency of a carrier signal for data transmission different. Alternatively, a feeder coil to wirelessly supply power to an electronic device may be disposed inside the housing or holding member constituting the signal transmission device.

The first communication device and the second communication device can be made to have substantially the same configuration. Then, the first communication device and the second communication device can be configured to include a transmission unit that converts data to be transmitted (transmission intended signal) into a high-frequency signal and transmits the high-frequency signal and a reception unit that receives the high-frequency signal transmitted from the transmission unit and converts the received signal into the transmission intended signal. If an electronic device is provided with the transmission unit and the reception unit, the electronic device can support bidirectional communication. Then, a high-frequency signal is transmitted between the transmission unit (reception unit) in the second communication device constituting an electronic device and the reception unit (transmission unit) in the first communication device constituting a signal transmission device via the second high-frequency signal waveguide and the first high-frequency signal waveguide. Alternatively, a high-frequency signal is transmitted between the transmission unit (reception unit) in the second communication device constituting the electronic device-B and the reception unit (transmission unit) in the second communication device constituting the electronic device-A via the second high-frequency signal waveguide, the first high-frequency signal waveguide and the second high-frequency signal waveguide. The first communication device and the second communication device may adopt frequency division multiplexing (FDM) or time division multiplexing (TDM).

It is preferable to mainly use the carrier frequency in the millimeter waveband (the wavelength ranges from 1 millimeter to 10 millimeter) for the high-frequency signal transmission (data transmission). However, the waveband is not limited to the millimeter waveband and the carrier frequency near the millimeter waveband, for example, the sub-millimeter waveband (the wavelength ranges from 0.1 millimeter to 1 millimeter) of a shorter wavelength or the centimeter waveband (the wavelength ranges from 1 centimeter to 10 centimeter) of a longer wavelength. Alternatively, for example, the sub-millimeter waveband to millimeter waveband, the millimeter waveband to centimeter waveband, or the sub-millimeter waveband to millimeter waveband to centimeter waveband may be used. That is, the wavelength of the carrier frequency in a high-frequency signal is preferably, for example, greater than or equal to 0.1 millimeter and less than or equal to 10 centimeter. If the millimeter waveband or a nearby waveband is used for high-frequency signal transmission, other wirings are not interfered with and, for example, the necessity of EMC measures for wirings such as flexible printed wirings is reduced. In addition, if the millimeter waveband or a nearby waveband is used, the rate of high-frequency signal transmission can be made higher when, for example, a wiring such as a flexible printed wiring is used for high-frequency signal transmission. Thus, higher image signal transmission resulting from higher resolutions and higher frame rates and demands for higher data rates can easily be supported. In addition, when compared with optical communication, a signal interface can be constructed easily in a low-price configuration.

Among various transmission intended signals, only transmission intended signals demanding high speed and large-capacity transmission intended signals may be selected for conversion into a high-frequency signal and transmission intended signals not demanding high speed, small-capacity transmission intended signals, and signals regarded as DC such as a power supply may not be selected for conversion into a high-frequency signal, or transmission intended signals not demanding high speed and small-capacity transmission intended signals may be selected for conversion into a high-frequency signal.

In a signal transmission device of the present disclosure, the first communication device and high-frequency signal waveguide may be modularized or integrated with a semiconductor chip. Also, in a signal transmission device of the present disclosure, the second communication device and second high-frequency signal waveguide may be modularized or integrated with a semiconductor chip, or the second communication device, second high-frequency signal waveguide, and second high-frequency signal transmission member may be modularized or integrated with a semiconductor chip. Alternatively, the second communication device and second high-frequency signal transmission member may be modularized or integrated with a semiconductor chip.

As the mode/shape of the signal transmission device, though not limited, a cradle device, electronic device mounting base, bar shape, plate shape, and block shape can be exemplified. As the electronic device, though not limited, a digital still camera, camcorder/video camera, portable phone, PHS, portable image reproducing apparatus, game machine, electronic book, and electronic dictionary can be exemplified and further, a printed wiring board is included in the electronic device.

EXAMPLE 1

Example 1 relates to a signal transmission device and an electronic device of the present disclosure. Conceptual diagrams of a signal transmission device and an electronic device according to Example 1 are shown in (A) to (D) of FIG. 1 and (A) to (D) of FIG. 2 and a signal transmission device according to Example 1 is configured by, for example, a cradle device. An electronic device according to Example 1 is configured by, for example, a digital still camera.

A signal transmission device 10 according to Example 1 includes a high-frequency signal waveguide (hereinafter, called a "first high-frequency signal waveguide 20" for convenience sake) that transmits a high-frequency signal (more specifically, a high-frequency signal in, for example, the millimeter waveband) emitted (outgoing) from an electronic device 30 and when the electronic device 30 is arranged close to the first high-frequency signal waveguide 20, transmits a high-frequency signal (denoted by a dotted line in drawings) as data via the first high-frequency signal waveguide 20. That is, the first high-frequency signal waveguide 20 has a function as a mount that relays (coupes) transmission of a high-frequency signal. More specifically, coupling based on the electromagnetic coupling/electric field is generated between the electronic device 30 and the first high-frequency signal waveguide 20. The electronic device 30 in Example 1 includes a communication means 31, but does not include the high-frequency signal waveguide. That is, the electronic device 30 in Example 1 is not an electronic device of the present disclosure.

The most basic configuration of the signal transmission device 10 according to Example 1 is shown in the conceptual diagram of (A) in FIG. 1.

The conceptual diagram shown in (B) of FIG. 1 includes an output unit 22 in addition to the configuration shown in (A) of FIG. 1. That is, the output unit 22 is connected or coupled to the first high-frequency signal waveguide 20. Then, a high-frequency signal as data transmitted via the first high-frequency signal waveguide 20 can be sent out to an apparatus (for example, a server apparatus (not shown)) via the output unit 22.

Further, in the conceptual diagram shown in (C) of FIG. 1, the signal transmission device 10 is connected to the first high-frequency signal waveguide 20 and further includes a communication device (hereinafter, called a "first communication device 21" for convenience sake) coupled to the first high-frequency signal waveguide 20. Then, when the electronic device 30 is arranged close to the first high-frequency signal waveguide 20, a high-frequency signal as data is transmitted from the electronic device (more specifically, the communication means 31) to the first communication device 21 via the first high-frequency signal waveguide 20. The transmitted high-frequency signal is sent out via the output unit 22.

In the conceptual diagram shown in (D) of FIG. 1, the signal transmission device 10 includes a control unit (first control unit 23) to control the signal transmission device 10 and/or to control the electronic device, in addition to the first communication device 21 and the output unit 22. The first control unit 23 is configured by, for example a microcomputer or a CPU, memory and the like.

Figure 2:
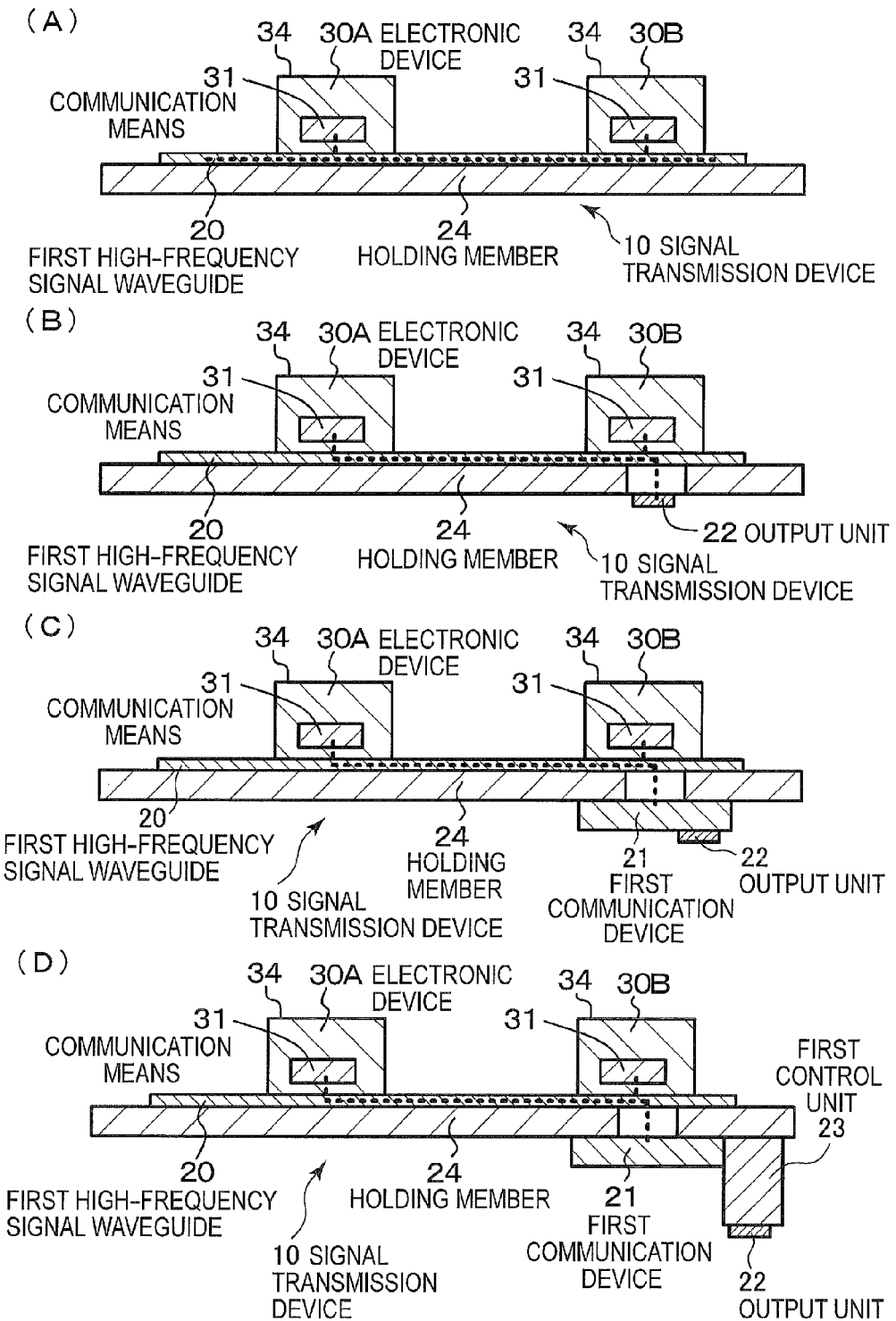
[FIG. 2] (A) to (D) of FIG. 2 are conceptual diagrams of a modification of the signal transmission device according to Example 1.

Further, in the conceptual diagram shown in (A) of FIG. 2, when a plurality of electronic devices 30A, 30B is arranged close to the first high-frequency signal waveguide 20, a high-frequency signal as data is transmitted between the plurality of electronic devices 30A, 30B via the first high-frequency signal waveguide 20. By performing high-frequency signal transmission between the plurality of electronic devices 30A, 30B via the first high-frequency signal waveguide 20 in this manner, for example, the electronic device 30B can be regarded as an external device or additional device of the electronic device 30A and the electronic device 30B can be used as an electronic device to extend the function of the electronic device 30A. That is, the functional extension or functional changes of the electronic device 30A can be made without changing the electronic device 30A itself In other words, the functional extension or functional changes of the electronic device 30A can be made by indirectly combining with the electronic device 30B without changing, for example, the design of the electronic device 30A or changing the printed wiring board or various parts constituting the electronic device 30A. In addition, in such a mode, the degree of freedom of combining the electronic device 30A and the electronic device 30B is extremely high and the combination of electronic devices can easily be changed.

In the conceptual diagram shown in (B) of FIG. 2, the first communication device 21 and the output unit 22 are further added to the configuration of the signal transmission device 10 shown in (A) of FIG. 2. In the conceptual diagram shown in (C) of FIG. 2, the first communication device 21 is further added to the configuration of the signal transmission device 10 shown in (B) of FIG. 2 and, in the conceptual diagram shown in (D) of FIG. 2, the first control unit 23 is further added to the configuration of the signal transmission device 10 shown in (C) of FIG. 2.

In the examples illustrated in (A) to (D) of FIG. 1 and (A) to (D) of FIG. 2, and (A) to (D) of FIG. 4 and (A) to (D) of FIG. 5 described later, the signal transmission device 10 further includes a holding member (support member) 24 and the first high-frequency signal waveguide 20 is formed on the holding member 24. In this case, the electronic device 30 as illustrated in FIG. 1 or an electronic device 40 according to Example 2 described later may be placed on the first high-frequency signal waveguide 20. However, the electronic devices 30, 40 are not limited to being placed and may be brought into contact or caused to approach the first high-frequency signal waveguide 20.

The first high-frequency signal waveguide 20 is formed from a polystylene whose relative dielectric constant is 2.5 and the holding member 24 is formed from an acrylic resin whose relative dielectric constant is 3.5. That is, the relative dielectric constant of the material (dielectric material) constituting the first high-frequency signal waveguide 20 and the relative dielectric constant of the material constituting the holding member 24 are different. The first high-frequency signal waveguide 20 can be formed on the holding member 24 or arranged thereon by using an adhesive. Such a method is called a "first manufacturing method" for convenience sake. Housings 34, 44 of the electronic device 30 or the electronic device 40 described later are produced from engineering plastics.

It is preferable to form a shielding layer (preferably, a metallic material layer containing metal plating or conductive polymeric material layer) on an external surface of the holding member 24 excluding a portion where the first high-frequency signal waveguide 20 is provided and the neighborhood thereof when the first high-frequency signal waveguide 20 is exposed from the holding member 24, on the external surface of the holding member 24 excluding a surface area corresponding to the first high-frequency signal waveguide 20 when the first high-frequency signal waveguide 20 is provided inside, or on the external surface excluding an opposed surface opposed to an electronic device so as not to be subject to unnecessary electromagnetic waves from outside or so as not to allow a high-frequency signal to be leaked out from inside the first high-frequency signal waveguide 20. If a shielding layer is formed, the shielding layer can reflect a high-frequency signal and thus, reflected components of the high-frequency signal can be used so that sensitivity can be improved. When an unnecessary standing wave is generated in the first high-frequency signal waveguide 20 due to multiple reflection, an absorbing member (wave absorber) that absorbs a high-frequency signal may be arranged.

These configurations are assumed to be such a configuration that when the electronic device 30, 40 is arranged close to the first high-frequency signal waveguide 20, the first high-frequency signal waveguide 20 and the electronic device 30, 40 are coupled by a vertically polarized electromagnetic wave. Specifically, a vertically polarized wave can be realized by setting up an electric field perpendicularly to the ground and more specifically, for example, the polarization direction of an antenna described later may be adjusted to the vertical direction. That is, coupling by a vertically polarized electromagnetic wave can be achieved by adjusting the polarization direction of the first high-frequency signal waveguide 20 and the electronic device 30, 40 to the vertical surface.

Figure 3:
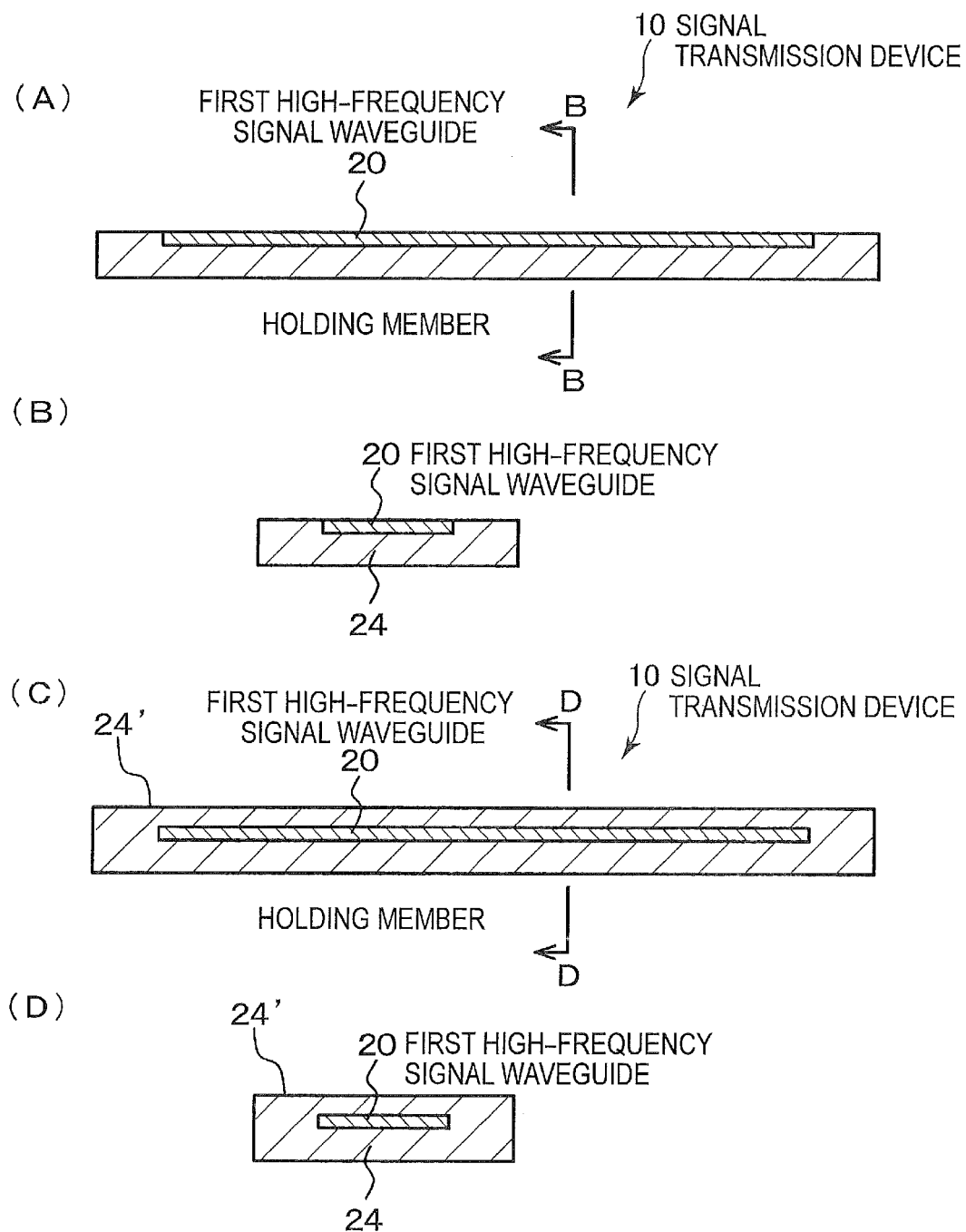
[FIG. 3] (A) to (D) of FIG. 3 are conceptual diagrams of another modification of the signal transmission device according to Example 1.

As a modification of (A) in FIG. 1, as shown in (A) and (B) of FIG. 3 as conceptual diagrams thereof, a configuration in which at least a portion (all of the first high-frequency signal waveguide 20 in the illustrated example) of the first high-frequency signal waveguide 20 is exposed from the holding member 24 may be adopted. (B) of FIG. 3 is a conceptual diagram of the signal transmission device 10 when the signal transmission device 10 is cut along arrows B-B in (A) of FIG. 3. That is, the first high-frequency signal waveguide 20 is buried in the holding member 24 formed from a material that is different from the material constituting the first high-frequency signal waveguide 20. In this case, the electronic device 30, 40 may be placed on, brought into contact with, or caused to approach a portion 20A of the first high-frequency signal waveguide 20 exposed from the holding member 24.

Alternatively, as a modification of (A) in FIG. 1, as shown in (C) and (D) of FIG. 3 as conceptual diagrams thereof, the first high-frequency signal waveguide 20 is arranged inside the holding member 24. (D) of FIG. 3 is a conceptual diagram of the signal transmission device 10 when the signal transmission device 10 is cut along arrows D-D in (C) of FIG. 3. In this case, the electronic device 30, 40 may be placed on, brought into contact with, or caused to approach a portion 24' of the holding member 24 facing the first high-frequency signal waveguide 20. To clarify the position where the electronic device 30, 40 should be placed, a recess to place the electronic device 30, 40 may be provided or an appropriate mark may be attached to the portion 24' of the holding member 24 facing the first high-frequency signal waveguide 20.

When, for example, the new electronic device 30, 40 is arranged close to the first high-frequency signal waveguide 20 of the signal transmission device 10, the first control unit 23 manages electronic device configuration information before and after the arrangement and transmits a high-frequency signal as data according to the changed electronic device configuration information. Alternatively, when a high-frequency signal as data is transmitted between a plurality of electronic devices 30, 40 via the first high-frequency signal waveguide 20 and the combination of the plurality of electronic devices 30, 40 is changed or the new electronic device 30, 40 is added, the first control unit 23 performs the high-frequency signal transmission in a state suited to the changed combination.

More specifically, the first communication device 21 emits a detection signal from the first high-frequency signal waveguide 20 under the control of the first control unit 23 and can detect the approach of some object to the first high-frequency signal waveguide 20 by detecting a reflected wave via the first high-frequency signal waveguide 20. On the other hand, the communication means 31 or a second communication device 51 of the electronic device 30, 40 having received a detection signal emitted from the first high-frequency signal waveguide 20 emits a predetermined signal specific to the electronic device 30, 40 to the first high-frequency signal waveguide 20 and the first communication device 21 received the signal. The operation described above is called a "electronic device confirmation operation" for convenience sake. Incidentally, the configuration of the first communication device 21, the communication means 31, and the second communication device 51 will be described in detail in Example 2.

Figure 4:
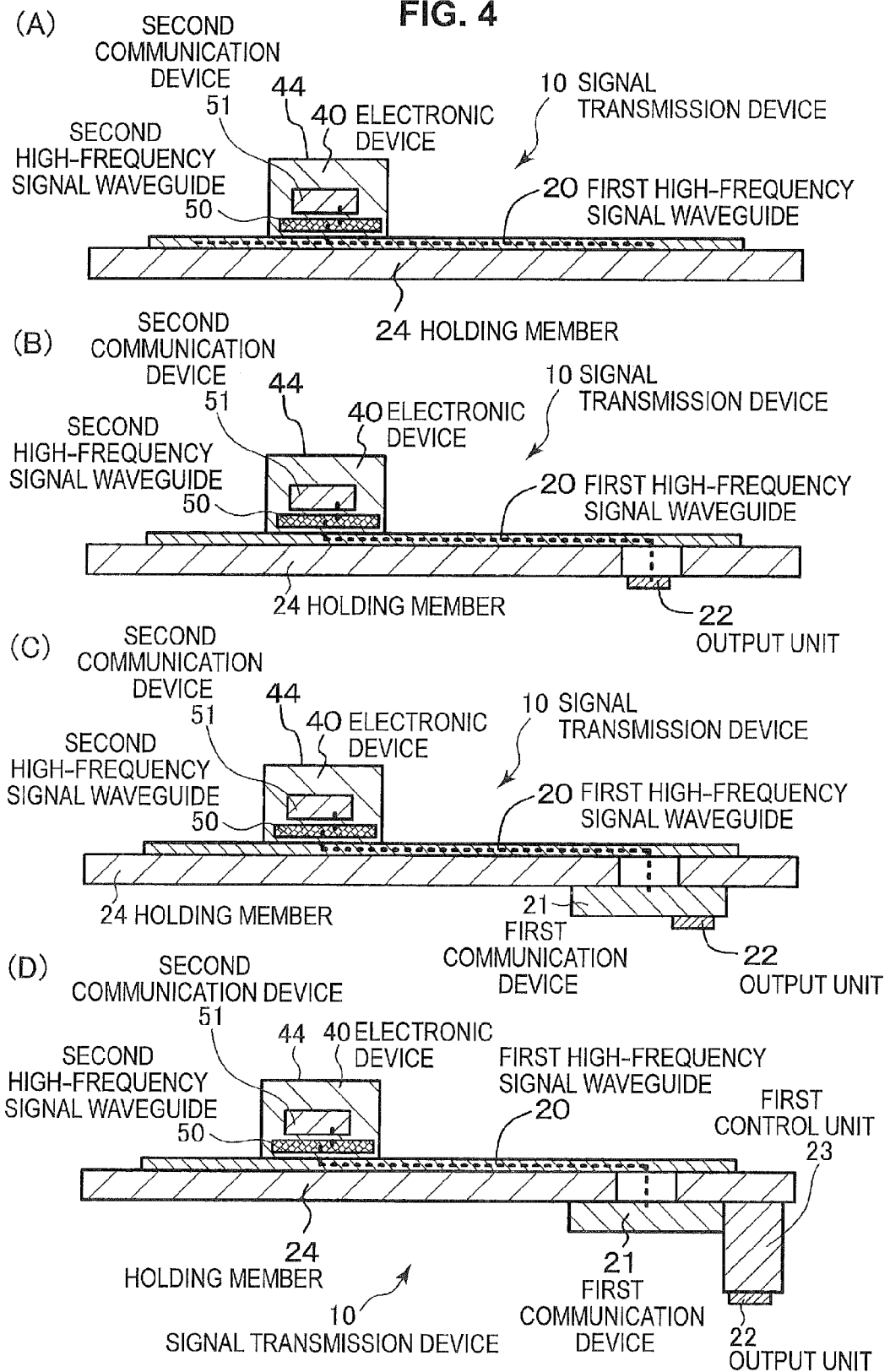
[FIG. 4] (A) to (D) of FIG. 4 are conceptual diagrams of the signal transmission device according to Example 1 and an electronic device according to Example 2.

Before an electronic device 30B, 40B is arranged close to the first high-frequency signal waveguide 20, it is assumed that, in the same manner as shown in (D) of FIG. 1 or (D) of FIG. 4, the electronic device 30B, 40B is in a state allowing the electronic device 30A, 40A to send out a high-frequency signal as data transmitted via the first high-frequency signal waveguide 20 to an external apparatus (for example, a television receiver (not shown)) via the output unit 22. If the electronic device 30B, 40B is arranged close to the first high-frequency signal waveguide 20 in this state, the first control unit 23 performs an electronic device confirmation operation and in the same manner as shown in (D) of FIG. 2 or (D) of FIG. 5, the first control unit 23 detects the presence of the electronic device 30B, 40B and switches to a mode in which high-frequency signal transmission is performed between a plurality of an electronic device 30A, 40A and the electronic device 30B, 40B via the first high-frequency signal waveguide 20 (and the second high-frequency signal waveguide 50).

Incidentally, the electronic device 30, 40 may include a second control unit (not shown) for control of the signal transmission device 10 and/or to control of the electronic device 30, 40. Alternatively, a control unit (external control unit) for control of the signal transmission device 10 and/or control of the electronic device 30, 40 may be disposed outside the apparatus. Alternatively, the first control unit 23 may normally place the first communication device 21 or the second communication device 51 in power saving mode so that when communication processing becomes necessary, that is, the first control unit 23 detects that the electronic device 30, 40 is arranged close to the first high-frequency signal waveguide 20, processing to switch from the power saving mode to the normal operation mode is performed. In addition, the first control unit 23 may be configured to detect the location of the first high-frequency signal waveguide 20 where the electronic device 30, 40 is arranged.

Alternatively, the first control unit 23 can also be configured to detect whether an object arranged close to the first high-frequency signal waveguide 20 is the electronic device 30, 40 or foreign object (object other than an electronic device). More specifically, the above electronic device confirmation operation is performed.

Accordingly, the first control unit 23 detects that an object arranged close to the first high-frequency signal waveguide 20 is the electronic device 30, 40. On the other hand, when an object arranged close to the first high-frequency signal waveguide 20 is a foreign object (object other than an electronic device), the first communication device 21 does not receive a predetermined signal specific to the electronic device 30, 40. Therefore, the first control unit 23 can detect that an object arranged close to the first high-frequency signal waveguide 20 is a foreign object (object other than an electronic device).

EXAMPLE 2

Example 2 relates to an electronic device of the present disclosure. The electronic device 40 according to Example 2 includes a communication device (hereinafter, called the "second communication device 51") and a high-frequency signal waveguide (hereinafter, called a "second high-frequency signal waveguide 50") that transmits a high-frequency signal emitted (outgoing) from the second communication device 51, wherein when the second high-frequency signal waveguide 50 is arranged close to a high-frequency signal waveguide (hereinafter, called the "first high-frequency signal waveguide 20") disposed outside, a high-frequency signal as data is transmitted from the second high-frequency signal waveguide 50 constituting the electronic device 40 to the first high-frequency signal waveguide 20 disposed outside.

Figure 5:
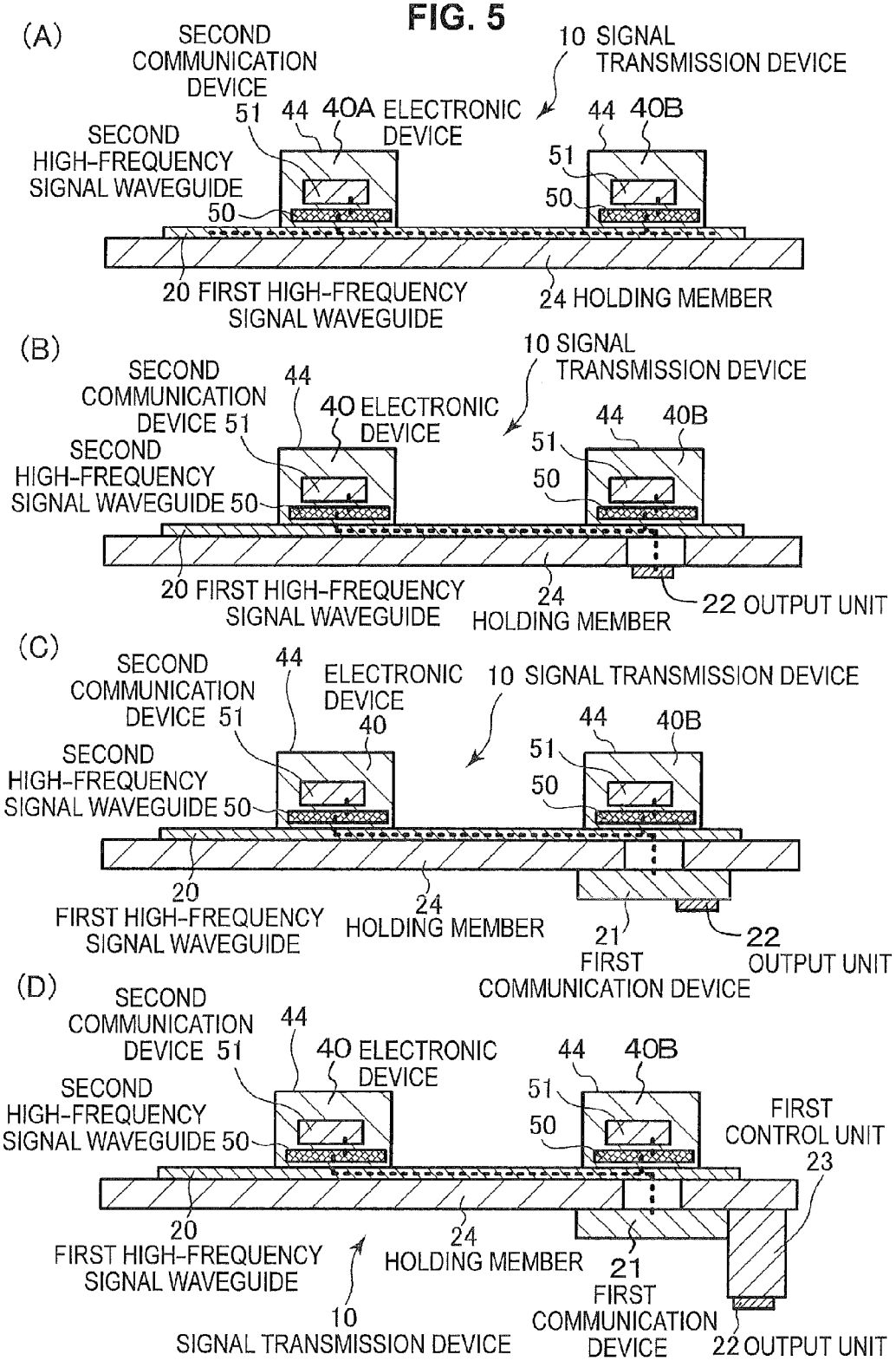
[FIG. 5] (A) to (D) of FIG. 5 are conceptual diagrams of the signal transmission device according to Example 1 and a modification of the electronic device according to Example 2.

Conceptual diagrams of the electronic device 40 according to Example 2 and the signal transmission device 10 described in Example 1 are shown in (A) to (D) of FIG. 4 and (A) to (D) of FIG. 5. The basic configuration of the signal transmission device 10 in Example 1 and the electronic device 40 in Example 2 is shown in the conceptual diagram of (A) in FIG. 4, which corresponds to (A) in FIG. 1. In conceptual diagrams shown in (B) to (D) of FIG. 4 and (A) to (D) of FIG. 5, the electronic device 30 in the configuration shown in (B) to (D) of FIG. 1 and (A) to (D) of FIG. 2 is replaced by the electronic device 40 of the present disclosure.

In the examples illustrated in (A) to (D) of FIG. 4 and (A) to (D) of FIG. 5, the second high-frequency signal waveguide 50 is arranged inside a housing 44 constituting the electronic device 40. In this case, a portion of the housing 44 facing the second high-frequency signal waveguide 50 may be placed on, brought into contact with, or caused to approach the holding member 24 or the first high-frequency signal waveguide 20.

As a modification of the electronic device 40, as shown in (A) of FIG. 6 as a conceptual diagram thereof, a configuration in which at least a portion (all of the second high-frequency signal waveguide 50 in the illustrated example) of the second high-frequency signal waveguide 50 is exposed from the housing 44 may be adopted. That is, the second high-frequency signal waveguide 50 is buried in the housing 44 formed from a material that is different from the material constituting the second high-frequency signal waveguide 50. In this case, a portion of the second high-frequency signal waveguide 50 exposed from the housing 44 may be placed on, brought into contact with, or caused to approach the holding member 24 or the first high-frequency signal waveguide 20.

Alternatively, as another modification of the electronic device 40, as shown in (B) of FIG. 6 as a conceptual diagram, a configuration in which the second high-frequency signal waveguide 50 is formed on the housing 44 may be adopted. Such a structure can be achieved by a method substantially the same as the above first manufacturing method. In this case, the second high-frequency signal waveguide 50 may be placed on, brought into contact with, or caused to approach the holding member 24 or the first high-frequency signal waveguide 20.

Figure 7:
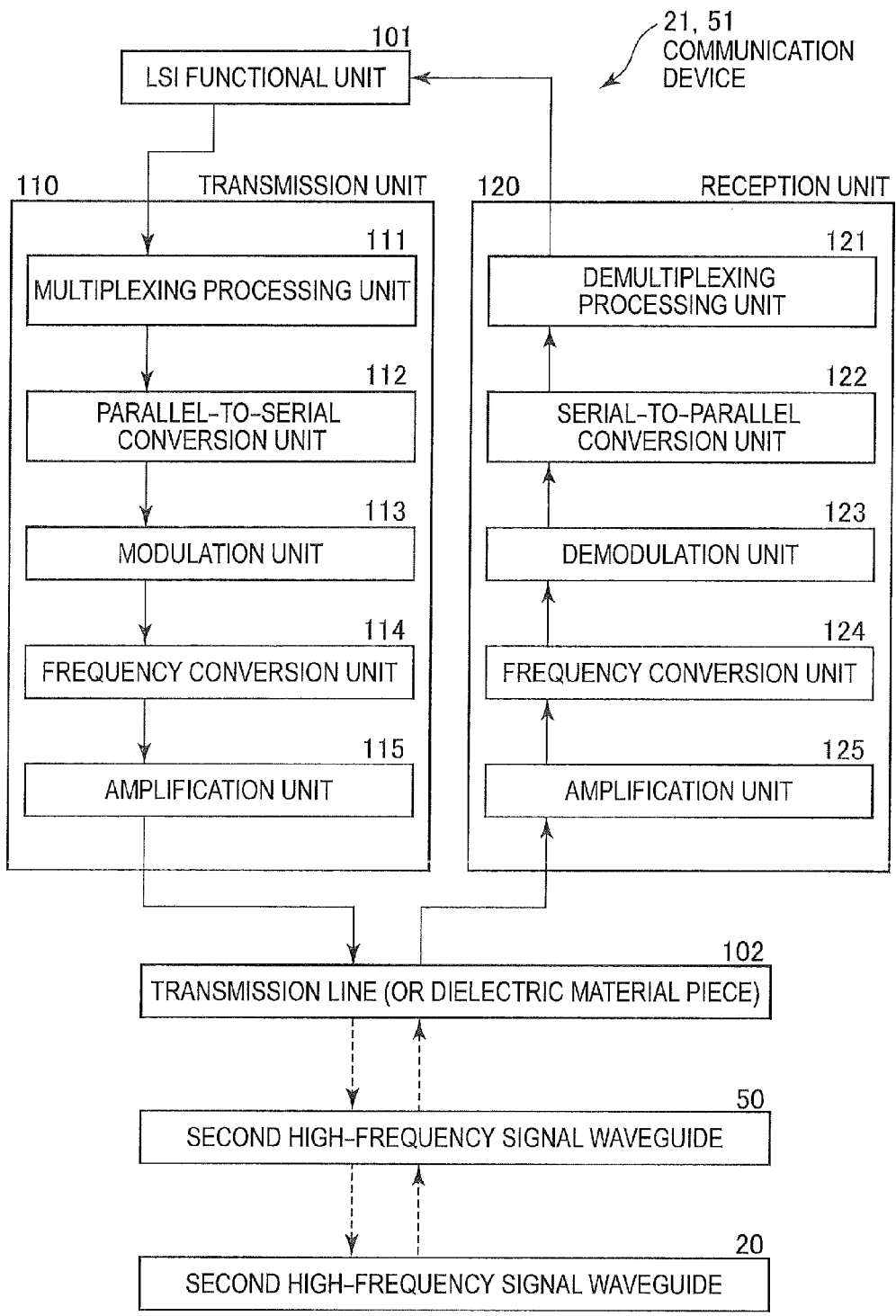
[FIG. 7]

The configuration of the first communication device 21 and the second communication device 51 or the communication means 31 will be described below. FIG. 7 shows a block diagram of the first communication device 21 and the second communication device 51. In the description that follows, the second communication device 51 will be described, but the first communication device 21 has the same configuration as that of the second communication device 51 except that the second high-frequency signal waveguide 50 is not included and also the communication means 31 has the same configuration as that of the second communication device 51 except that the second high-frequency signal waveguide 50 is not included. If the so-called frequency division multiplexing (FDM) using a plurality of carrier frequencies using different frequencies or time division multiplexing (TDM), communication of a plurality of systems can be performed by the one first high-frequency signal waveguide 20.

Though not limited, the second communication device 51 and the second high-frequency signal waveguide 50 are integrated with a semiconductor chip. The second communication device 51 includes an LSI functional unit 101 as a preceding signal processing unit, a transmission unit 110, a reception unit 120, and a transmission line (or a dielectric material piece) 102 and is mounted on a printed wiring board. The LSI functional unit 101 controls main applications of the second communication device 51 and includes a processing circuit that processes, for example, various signals to be transmitted and also processes various received signals.

The transmission unit 110 includes a multiplexing processing unit 111, a parallel-to-serial conversion unit 112, a modulation unit 113, a frequency conversion unit 114, and an amplification unit 115 and performs signal processing of a signal (transmission intended signal) to be transmitted from the LSI functional unit 101 to convert (generate) the signal into a high-frequency signal in the millimeter waveband. Incidentally, the modulation unit 113 and the frequency conversion unit 114 may be integrated as a so-called direct conversion method.

When a plurality of transmission intended signals in the millimeter waveband among signals from the LSI functional unit 101, the multiplexing processing unit 111 integrates the plurality of transmission intended signals into a transmission intended signal by performing multiplexing processing such as time division multiplexing, frequency division multiplexing, and code division multiplexing. For example, a plurality of transmission intended signals demanding high speed or large capacity is integrated into a transmission intended signal to be transmitted in the millimeter waveband. The parallel-to-serial conversion unit 112 converts signals to be transmitted in parallel into a serial transmission intended signal, which is supplied to the modulation unit 113. The parallel-to-serial conversion unit 112 needs to be included for parallel interface specifications, but does not need to be included for serial interface specifications.

The modulation unit 113 only needs to be a circuit that modulates a transmission intended signal by at least one of the amplitude, frequency, and phase and a method of any combination of these can be adopted. As an analog modulation method, for example, the amplitude modulation (AM) and vector modulation can be cited. As the vector modulation, the frequency modulation (FM) and phase modulation (PM) can be cited. As a digital modulation method, for example, the amplitude shift keying (ASK), frequency shift keying (FSK), phase shift keying (PSK), and amplitude phase shift keying (APSK) that modulates the amplitude and phase can be cited. The quadrature amplitude modulation (QAM) is representative of the amplitude phase shift keying. Here, the method that can adopt the synchronous detection method particularly on the reception unit side is adopted. Then, a transmission intended signal is modulated by the modulation unit 113 before being supplied to the frequency conversion unit 114.

The frequency conversion unit 114 performs frequency conversions of the transmission intended signal modulated by the modulation unit 113 to generate a high-frequency signal in the millimeter waveband, which is supplied to the amplification unit 115. The high-frequency signal in the millimeter waveband refers to an electric signal of the frequency in the range of mainly 30 GHz to 300 GHz. Here, "mainly" means that the frequency only needs to be such a frequency that an effect by millimeter waveband communication can be obtained and the lower limit is not limited to 30 GHz and the upper limit is not limited to 300 GHz. Various circuit configurations can be adopted for the frequency conversion unit 114 and, for example, a configuration including a frequency mixing circuit (mixer circuit) and a local oscillation circuit may be adopted. In the local oscillation circuit, carrier waves (carrier signals, reference carrier waves) used for modulation are generated. In the frequency mixing circuit, a signal from the parallel-to-serial conversion unit 112 and a carrier wave in the millimeter waveband generated by the local oscillation circuit are multiplied (modulated) to generate a high-frequency signal in the millimeter waveband as data.

The amplification unit 115 has a function of adjusting the amplitude to be output by adjusting the magnitude of an input signal. In the amplification unit 115, the high-frequency signal in the millimeter waveband after the frequency conversion is amplified and sent out to the second high-frequency signal waveguide 50 (the electronic device 40) or the first high-frequency signal waveguide 20 (the electronic device 30) via the transmission line (or the dielectric material piece) 102 formed of, for example, a micro strip line, strip line, coplanar line, slot line or the like.

On the other hand, the reception unit 120 includes an amplification unit 125, a frequency conversion unit 124, a demodulation unit 123, a serial-to-parallel conversion unit 122, and a demultiplexing processing unit 121 and performs signal processing of a high-frequency signal in the millimeter waveband received by the second high-frequency signal waveguide 50 or the transmission line (or the dielectric material piece) 102 to obtain a transmission intended signal. Incidentally, the frequency conversion unit 124 and the demodulation unit 123 may be integrated as a so-called direct conversion method. Alternatively, a demodulated carrier signal may be generated by applying the injection lock method.

The amplification unit 125 functions to adjust the amplitude to be output by adjusting the magnitude of an input signal. The amplification unit 125 is connected or coupled to the transmission line (or the dielectric material piece) 102. Then, the amplification unit 125 amplifies a high-frequency signal in the millimeter waveband received by the second high-frequency signal waveguide 50 or the transmission line (or the dielectric material piece) 102 (the electronic device 40) or a high-frequency signal in the millimeter waveband from the first high-frequency signal waveguide 20 (the electronic device 30) via the transmission line (or the dielectric material piece) 102 and supplies the amplified signal to the frequency conversion unit 124. The frequency conversion unit 124 performs frequency conversions of the high-frequency signal in the millimeter waveband after the amplification and supplies the converted signal to the demodulation unit 123. In the demodulation unit 123, the signal after the frequency conversion is demodulated and the demodulated signal is supplied to the serial-to-parallel conversion unit 122. In the serial-to-parallel conversion unit 122, the serial demodulated signal is converted into parallel signals, which are supplied to the demultiplexing processing unit 121. The serial-to-parallel conversion unit 122 needs to be included for parallel interface specifications, but does not need to be included for serial interface specifications. The demultiplexing processing unit 121 corresponds to the multiplexing processing unit 111 and separates an integrated signal into a plurality of transmission intended signals. For example, a plurality of transmission intended signals integrated into a signal is separated and supplied to the LSI functional unit 101.

The second communication device 51 described above is configured to support bidirectional communication, but is configured to support unidirectional communication when only the transmission unit or the reception unit is included. The "bidirectional communication" of the above configuration is 1-conductor bidirectional communication in which the millimeter waveband signal transmission line as a transmission channel in the millimeter waveband has one conductor. Then, the half-duplex method applying time division multiplexing (TDM), frequency division multiplexing (FDM), or the like can be applied.

The second communication device 51 can be modularized by molding the whole apparatus from resin or the second communication device 51 and a second high-frequency signal transmission member can also be modularized.

A second high-frequency signal transmission member connected or coupled to the transmission line 102 may be disposed between the transmission line 102 and the second high-frequency signal waveguide 50. When such a configuration is adopted, the second high-frequency signal transmission member can transmit a high-frequency signal in the millimeter waveband generated by the second communication device 51 to the second high-frequency signal waveguide 50 and receive a high-frequency signal from the second high-frequency signal waveguide 50. The second high-frequency signal transmission member can be configured by, for example, an antenna. An antenna can be formed on the external surface of the modularized second communication device 51 by, for example, the plating method, can be provided forming and etching a metallic layer, or can be provided by pasting patterned metal foil together. In addition, the transmission line 102 can be replaced by a material piece constituting the second high-frequency signal waveguide 50 and coupling based on the electromagnetic coupling/electric field can also thereby be formed between the material piece and the second high-frequency signal waveguide 50.

The directivity of the second high-frequency signal transmission member may be horizontal polarization (plane defined by the length direction and width direction of second high-frequency signal waveguide 50) or vertical polarization (thickness direction of the second high-frequency signal waveguide 50). Alternatively, the directivity may be circular polarization. When the second high-frequency signal transmission member is configured by, for example, a dipole antenna or Yagi antenna, the directivity of such an antenna is horizontal polarization and in the electronic device 30, a high-frequency signal radiated from the second high-frequency signal transmission member is coupled with the first high-frequency signal waveguide 20 in the horizontal direction, that is, is coupled with the first high-frequency signal waveguide 20 by a horizontally polarized electromagnetic wave to propagate inside the first high-frequency signal waveguide 20. Alternatively in the electronic device 40, a high-frequency signal radiated from the second high-frequency signal transmission member is coupled with the second high-frequency signal waveguide 50 in the horizontal direction, that is, is coupled with the second high-frequency signal waveguide 50 by a horizontally polarized electromagnetic wave to propagate inside the second high-frequency signal waveguide 50. When the second high-frequency signal transmission member is configured by, for example, a patch antenna or slot antenna, the directivity of such an antenna is vertical polarization and in the electronic device 30, a high-frequency signal radiated from the second high-frequency signal transmission member is coupled with the first high-frequency signal waveguide 20 in the vertical direction, that is, is coupled with the first high-frequency signal waveguide 20 by a vertically polarized electromagnetic wave to propagate inside the first high-frequency signal waveguide 20. Alternatively in the electronic device 40, a high-frequency signal radiated from the second high-frequency signal transmission member is coupled with the second high-frequency signal waveguide 50 in the vertical direction, that is, is coupled with the second high-frequency signal waveguide 50 by a vertically polarized electromagnetic wave to propagate inside the second high-frequency signal waveguide 50. When a high-frequency signal radiated from the second high-frequency signal transmission member is coupled with the high-frequency signal waveguides 20, 50 by a horizontally polarized electromagnetic wave, transmission of a high-frequency signal in the horizontal direction of the high-frequency signal waveguides 20, 50 is excellent. On the other hand, when a high-frequency signal radiated from the second high-frequency signal transmission member is coupled with the high-frequency signal waveguides 20, 50 by a vertically polarized electromagnetic wave, electromagnetic coupling is excellent. The above description is also applicable to the first high-frequency signal transmission member.

The signal transmission device 10 according to Example 1 or Example 2 includes the first high-frequency signal waveguide 20 and transmits a high-frequency signal as data emitted from the close electronic device 30, 40 via the first high-frequency signal waveguide 20. The electronic device 40 according to Example 2 includes the second high-frequency signal waveguide 50 and, when the second high-frequency signal waveguide 50 is arranged close to the first high-frequency signal waveguide 20 disposed outside, a high-frequency signal as data is transmitted from the second high-frequency signal waveguide 50 constituting the electronic device 40 to the first high-frequency signal waveguide 20 disposed outside. Therefore, data can be exchanged between electronic devices without connecting a general-purpose cable therebetween, the degree of freedom of arranging electronic devices is high, and power consumption does not increase. Moreover, a signal to be transmitted (transmission intended signal) is converted into a high-frequency signal for high-frequency signal transmission and thus, a wide communication range and a high transmission rate can be achieved. Further, coupling is good, the transmission loss is small, the reflection of a high-frequency signal in the signal transmission device 10 and electronic devices 30, 40 can be suppressed, multipaths and unnecessary radiation can be reduced at high transmission rate, and also transmission degradation can be suppressed. In addition, confidentiality of information (data) is high because a high-frequency signal can be confined to within the high-frequency signal waveguide.

A conceptual diagram of a conventional signal transmission device is shown in (A) of FIG. 22 and an electric interface is shown in (B) of FIG. 22. In a signal transmission device 700, a first apparatus 710 and a second apparatus 720 are coupled via an electric interface 730 to perform signal transmission. The first apparatus 710 and the second apparatus 720 include semiconductor chips 712, 721 capable of transmitting a signal via an electric wiring respectively. Thus, the conventional signal transmission device shown in FIG. 22 has a configuration in which the first high-frequency signal waveguide 20 in Example 1 or Example 2 is replaced by the electric interface (electric wiring) 730. To perform signal transmission via the electric interface (electric wiring) 730, the electric signal conversion unit 712 is provided in the first apparatus 710 and the electric signal conversion unit 722 is provided in the second apparatus 720. An electric signal from an LSI functional unit 713 in the first apparatus 710 is sent to the second apparatus 720 via the electric signal conversion unit 712 and the electric interface 730 and data is obtained by an LSI functional unit 723 in the second apparatus 720 via the electric signal conversion unit 722.

An electronic device having a solid-state imaging apparatus such as a digital camera performs various kinds of signal processing such as image processing of an electric signal from the solid-state imaging apparatus, compression processing, and image storage by a signal processing apparatus frequently placed outside the solid-state imaging apparatus. High-speed transfer technology of an electric signal is needed between the solid-state imaging apparatus and signal processing apparatus to support, for example, a higher resolution and a higher frame rate. To respond to such needs, the LVDS (Low Voltage Differential Signaling) technology is frequently used. To transmit an LVDS signal with precision, a matched impedance termination is needed, but it is becoming more difficult to ignore increased power consumption.

Moreover, to transmit a plurality of LVDS signals that need to be synchronized, mutual wiring lengths need to be maintained equal to sufficiently minimize wiring delays. Measures such as increasing the number of LVDS signal lines may be taken to transfer an electric signal at a higher speed, but in this case, it becomes more difficult to design a printed wiring board and complicatedness of printed wiring boards and cable wiring and an increase of the number of terminals for wiring to connect a solid-state imaging apparatus and a signal processing apparatus are invited, making compactness and lower costs more difficult to achieve. Further, an increased number of signal lines invites an increase in cost of cables and connectors.

According to Example 1 or Example 2, by contrast, the electric interface (electric wiring) 730 of a conventional signal transmission device is replaced by the first high-frequency signal waveguide 20 to perform signal transmission by using a high-frequency signal, instead of the electric wiring. Therefore, connectors and cables are not needed, which can achieve cost reductions, and there is no need to consider reliability of connectors and cables, which improves reliability of transmission paths. In addition, when connectors or cables are used, the space and assembly time for fitting are needed, but according to Example 1 or Example 2, the space and assembly time for fitting are not needed.

EXAMPLE 3

Example 3 is a modification of Example 1 and Example 2. A conceptual diagram of a signal transmission device, electronic device and the like according to Example 3 is shown in (A) of FIG. 8. In Example 3, the electronic device includes an electronic device 340B configured as a digital still camera and an electronic device 340A configured as an HDMI adapter that can be attached to and removed from the digital still camera 340B. The electronic device 340A corresponds to the electronic device 30 in Example 1 and the electronic device 40 in Example 2. In the illustrated example, the electronic device 340A corresponds to the electronic device 40 in Example 2. A cradle device 300 is configured by a body portion 301, the holding member 24 is arranged at an apex of the body portion 301, and the first high-frequency signal waveguide 20 is provided on the holding member 24. Incidentally, the first high-frequency signal waveguide 20 may be arranged inside the holding member 24 or may be structured so that at least a portion of the first high-frequency signal waveguide 20 is exposed from the holding member 24. The first high-frequency signal waveguide 20 is produced from a polyethylene resin (relative dielectric constant 2.5) of the width 3.0 mm, length 150 mm, and thickness 1.0 mm and stuck to the apex of the holding member 24 formed from an acrylic resin (relative dielectric constant 3.5). Actually, the holding member 24 and the body portion 301 are integrally produced.

If, in such a configuration, the housing of the electronic device 340B is produced from a metal or alloy or a material having a high relative dielectric constant (for example, a material whose relative dielectric constant exceeds 10), a high-frequency signal emitted from the first high-frequency signal waveguide 20 does not enter the electronic device 340B. On the other hand, if the housing of the electronic device 340B is produced from a material having a low relative dielectric constant, there is a possibility that a high-frequency signal emitted from the first high-frequency signal waveguide 20 enters the electronic device 340B. Therefore, it is preferable to form a shielding layer such as a metal layer in a portion of the electronic device 340B in contact with the first high-frequency signal waveguide 20.

In Example 3, image data recorded in the electronic device 340B (digital still camera) can be sent out to an external television receiver as an HDMI signal via the electronic device 340A (HDMI adapter), the second communication device 51, the second high-frequency signal waveguide 50, the first high-frequency signal waveguide 20, the first communication device 21, the first control unit 23, and the output unit 22 by placing the electronic device 340A and the electronic device 340B as an integrated unit on the cradle device 300, more specifically, on the first high-frequency signal waveguide 20. A schematic diagram of the signal transmission device 10 when the first high-frequency signal waveguide 20 is cut by a virtual plane perpendicular to the length direction of the first high-frequency signal waveguide 20 is shown in (B) of FIG. 8. As shown in (C) and (D) of FIG. 8 as schematic diagrams of the signal transmission device 10 when the first high-frequency signal waveguide 20 is cut by a similar virtual plane, a conductive layer 27 formed from copper foil may be formed between the holding member 24 and the first high-frequency signal waveguide 20 or a laminated structure of the first high-frequency signal waveguide 20, the holding member 24, and the conductive layer 27 may be adopted. By providing the conductive layer 27, the electric field strength in the vertical direction can be increased. In addition, a mode in which the electronic device 340A is omitted can be adopted by the function of the electronic device 340A being included in the electronic device 340B.

High-frequency signal transmission tests by setting the combination of (second high-frequency signal transmission member in the second communication device 51, first high-frequency signal transmission member in the first communication device 21) as (patch antenna, patch antenna), (Yagi antenna, Yagi antenna), (patch antenna, Yagi antenna) and (Yagi antenna, patch antenna) showed that high-frequency signal transmission could reliably be performed in all combinations.

EXAMPLE 4

Figure 9:
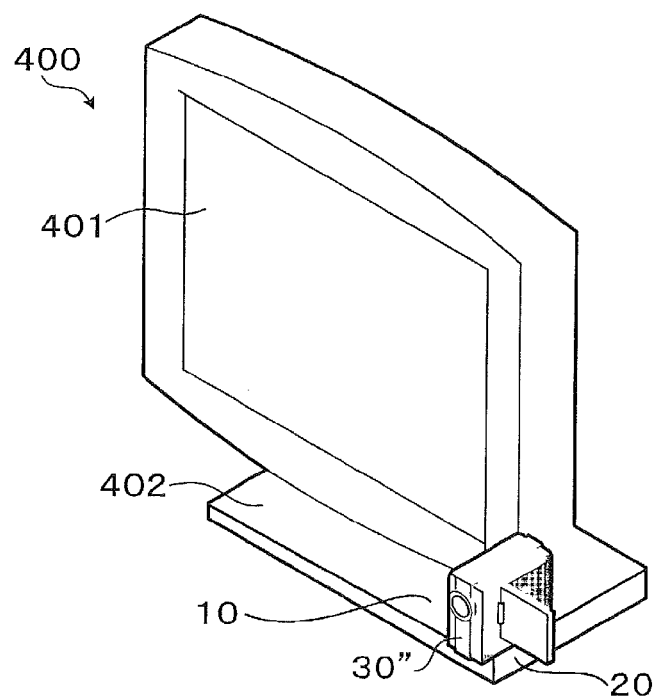
[FIG. 9]

Example 4 is also a modification of Example 1 and example 2 and is an example in which the signal transmission device 10 is incorporated into a television receiver 400. The electronic device is configured by, for example, a camcorder 30". As shown in FIG. 9, the television receiver 400 has a structure in which a display unit 401 is supported by a pedestal 402. The signal transmission device 10 (not concretely illustrated) described in Example 1 or Example 2 is incorporated into a portion of the pedestal 402. By placing the camcorder 30" on the first high-frequency signal waveguide 20 of the signal transmission device 10 incorporated into the pedestal 402, image data captured by the camcorder 30" is sent to the television receiver 400 to display HD animation or an HD still image in the display unit 401.

EXAMPLE 5

In Example 5, the shape of the first high-frequency signal waveguide and the like will be described and the description can also be applied to the second high-frequency signal waveguide. In the examples shown in FIGS. 10 to 19, the first high-frequency signal waveguide is two-dimensional as a whole. In the example shown in FIG. 20, on the other hand, the first high-frequency signal waveguide is three-dimensional as a whole.

Figure 10:
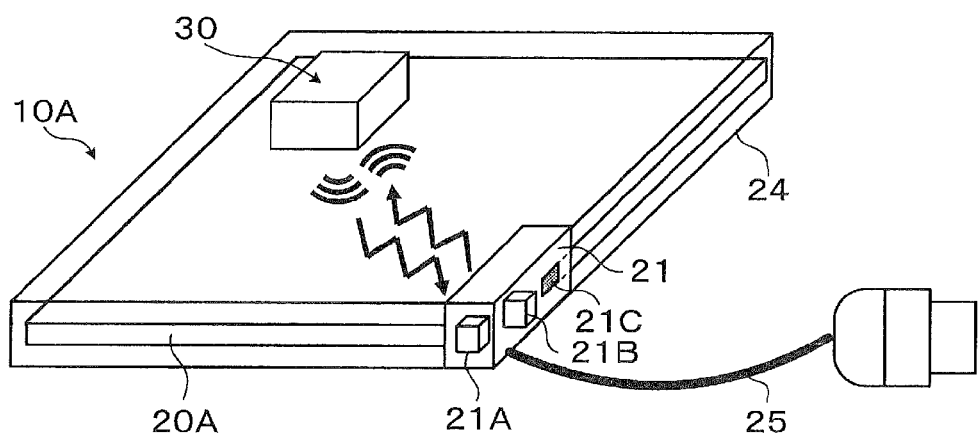
[FIG. 10]

In the example shown in FIG. 10, a first high-frequency signal waveguide 20A in a signal transmission device 10A has a flat-plate shape and is formed from a flexible material or stiff material, more specifically, a polystyrene resin having the thickness of, for example, 1.0 mm. However, the material and thickness are not limited to the above examples and the dielectric material constituting the first high-frequency signal waveguide 20A and the thickness thereof may be decided depending on a high-frequency signal. By using the above first high-frequency signal waveguide 20A, a high-frequency signal can be transmitted by confining the signal within the first high-frequency signal waveguide 20A. The first high-frequency signal waveguide 20A formed from one flat plate is arranged inside the holding member 24. The first communication device 21 to transmit/receive a high-frequency signal as data is mounted on a side portion of the first high-frequency signal waveguide 20A and the first communication device 21 is connected to a server apparatus (not shown) via a wiring 25. An external control unit may be provided in the server apparatus. The number of the first communication devices 21 is not limited to one and a plurality of apparatuses may be arranged. Based on a plurality of the first communication devices 21, MIMO (Multi-Input, Multi-Output) can be applied. This also applies to other application examples described later.

The first communication device 21 includes, for example, a transmission/reception circuit unit 21A including the transmission unit 110 and the reception unit 120, an resonance unit 21B, and a transmission/reception electrode 21C. The transmission/reception electrode 21C is mounted on a side face of the first high-frequency signal waveguide 20. The resonance unit 21B and the transmission/reception electrode 21C constitute a mount that couples high-frequency signals on the side face of the first high-frequency signal waveguide 20. In FIG. 10, the first communication device 21 is mounted on a corner portion of the first high-frequency signal waveguide 20, but the mounting location is not limited to the above example. However, it is preferable to arrange the side face of the first high-frequency signal waveguide 20 on the front side of the transmission/reception electrode 21C approximately perpendicularly to the electrode surface to increase the angle of incidence of a surface wave radiated from the transmission/reception electrode 21C (or the angle of incidence of a surface wave incident on the transmission/reception electrode 21C) to decrease the ratio emitted to the outside as a transmitted wave. When a transmission request is generated by a server apparatus, the transmission unit 110 of the transmission/reception circuit unit 21A generates a high-frequency signal based on the signal to be transmitted (transmission intended signal). The high-frequency signal output from the transmission unit 110 is oscillated by the resonance unit 21B and radiated in the front direction from the transmission/reception electrode 21C as a surface wave to propagate through the first high-frequency signal waveguide 20. Also, a high-frequency signal output from the electronic device 30 propagates through the first high-frequency signal waveguide 20 as a surface wave. The reception unit 120 of the transmission/reception circuit unit 21A performs demodulation and decoding processing of a high-frequency signal received by the transmission/reception electrode 21C to send out the reproduced data to the server apparatus. Inside the first high-frequency signal waveguide 20, a surface wave is propagated without losses by repeating the reflection each time the surface wave reaches the boundary surface with the outside. Therefore, a high-frequency signal in the millimeter waveband can be transmitted through the interposition of the first high-frequency signal waveguide 20. Incidentally, the configuration and structure of the first communication device are not limited to the above configuration and structure.

Figure 11:
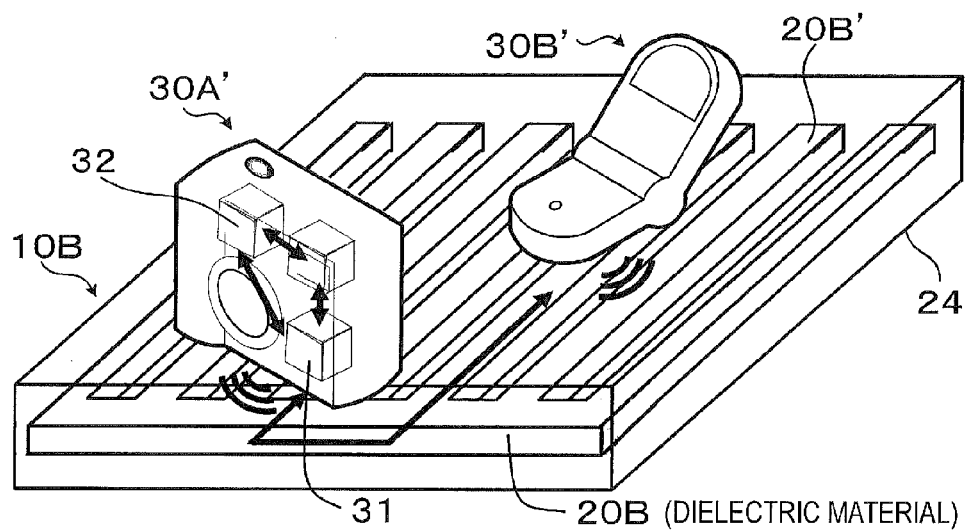
[FIG. 11]

In the example shown in FIG. 11, a first high-frequency signal waveguide 20B in a signal transmission device 10B has a comb shape and is formed from a dielectric material, more specifically, a polystyrene resin having the thickness of, for example, 1.0 mm. However, the material and thickness are not limited to the above examples and the dielectric material constituting the first high-frequency signal waveguide 20B and the thickness thereof may be decided depending on a high-frequency signal. The holding member 24 is formed from an acrylic resin having the thickness of, for example, 1.0 mm and the first high-frequency signal waveguide 20B is arranged inside the holding member 24. A space between a comb tooth portion 20B' and a comb tooth portion 20B' of the first high-frequency signal waveguide 20B is filled with the holding member 24. This also applies below. A digital still camera 30A' and a portable phone 30B' are placed on the first high-frequency signal waveguide 20B. The digital still camera 30A' and the portable phone 30B' correspond to the electronic device 30 in Example 1. Various semiconductor chips 32 are disposed inside the digital still camera 30A' and one semiconductor chip corresponds to the communication means 31 and another semiconductor chip corresponds to a second control unit. This also applies in the electronic device 30B'.

If, as shown in FIG. 11, the user operates an operation start switch (not shown) provided in the digital still camera 30A' in a state in which the digital still camera 30A' and the portable phone 30B' are placed on the first high-frequency signal waveguide 20B, under the control of the second control unit included in the digital still camera 30A', the communication means 31 emits a detection signal to the first high-frequency signal waveguide 20B to be able to detect the presence of the portable phone 30B' by detecting a reflected wave from the portable phone 30B' via the first high-frequency signal waveguide 20B and further detecting a predetermined signal specific to the portable phone 30B' via the first high-frequency signal waveguide 20B. The operation described above is substantially the same as the above "electronic device confirmation operation". Then, the digital still camera 30A' having detected the presence of the portable phone 30B' transfers image data recorded internally to the portable phone 30B' via the communication means 31, the first high-frequency signal waveguide 20B, and the communication means 31. The image data transferred to the portable phone 30B' is sent out to the outside based on the communication function of the portable phone 30B'. In this manner, the function of transmitting image data acquired by the digital still camera 30A' to the outside via the portable phone 30B' and further a communication line, WLAN or the line can be realized. That is, the portable phone 30B' can be regarded as an external device or additional device of the digital still camera 30A' and the portable phone 30B' can be used as an electronic device to extend the function of the digital still camera 30A'. That is, the functional extension or functional changes such as adding a communication function to the digital still camera 30A' can be made without changing the digital still camera 30A' itself In other words, the functional extension or functional changes of the digital still camera 30A' can be made by indirectly combining with the portable phone 30B' without changing, for example, the design or specifications of the digital still camera 30A'.

It is desirable to decide the width of the comb tooth portion 20B' and the width of space between the comb teeth 20B' so that a high-frequency signal from the communication means 31 of the electronic device 30 is not detected by a plurality of the comb teeth 20B' from the viewpoint of preventing the occurrence of a multipath phenomenon such as interference of high-frequency signals between a plurality of paths. That is, if the communicable width of a high-frequency signal is DT, the width of the comb tooth portion 20B' is W, and the width of space between the neighboring comb teeth 20B' is w, the following relation $$DT < W + w$$

may be set. Alternatively, when a signal specific to an electronic device is detected via the first high-frequency signal waveguide 20B, the transfer of a high-frequency signal may be started if a signal specific to an electronic device of a predetermined strength or more is detected and if a signal specific to an electronic device of a predetermined strength or more is not detected, the user may be prompted to make fine adjustments of the mounting position of the electronic device based on a sound circuit or LED display (not shown) provided with the electronic device or the signal transmission device.

The location of the first high-frequency signal waveguide 20B having a comb shape where an electronic device is placed can be detected based on a time difference of high-frequency signals based on the position of the electronic device placed on the first high-frequency signal waveguide 20B.

Figure 12:
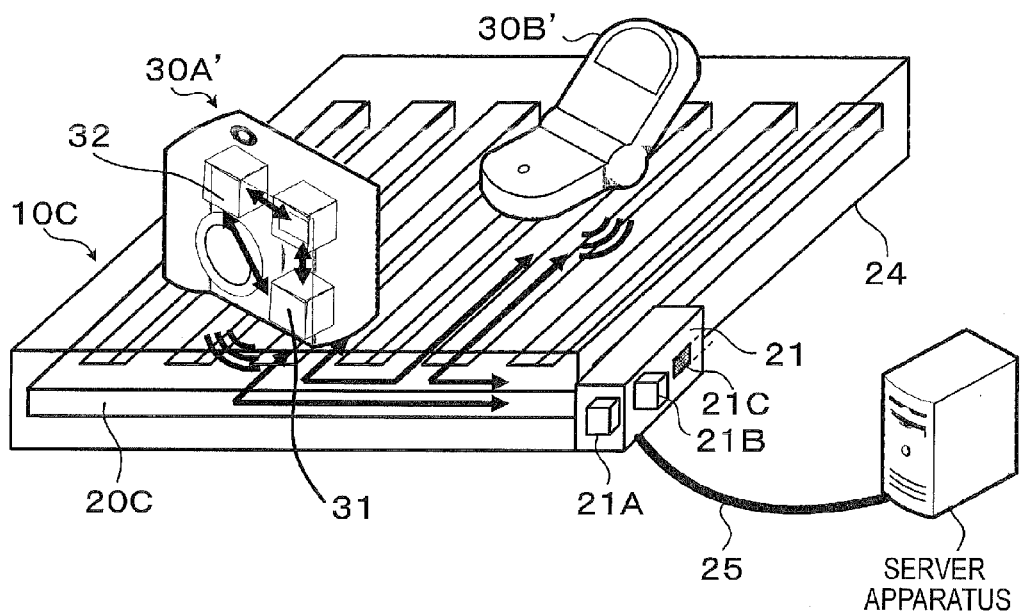
[FIG. 12]

A signal transmission device 10C including a first high-frequency signal waveguide 20C shown in FIG. 12 is a modification of the signal transmission device 10B shown in FIG. 11 and includes the first communication device 21 similar to one shown in FIG. 10 and the first communication device 21 is connected to a server apparatus.

Figure 13:
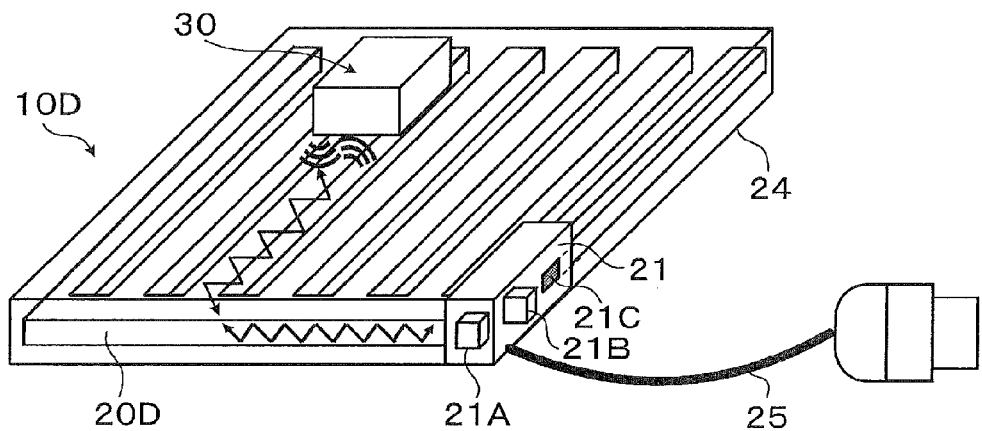
[FIG. 13]

A signal transmission device 10D shown in FIG. 13 is also a modification of the signal transmission device 10B shown in FIG. 11 and includes the first communication device 21 similar to one shown in FIG. 10 and the first communication device 21 is connected to a server apparatus. Incidentally, in contrast to FIG. 12, the one electronic device 30 is placed on a first high-frequency signal waveguide 20D.

Figure 14:
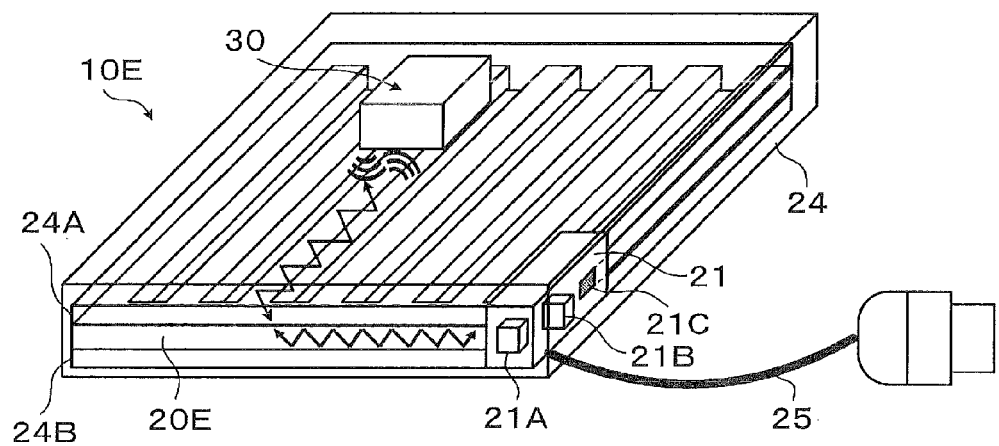
[FIG. 14]

A signal transmission device 10E shown in FIG. 14 is also a modification of the signal transmission device 10B shown in FIG. 11 and includes the first communication device 21 similar to one shown in FIG. 10 and the first communication device 21 is connected to a server apparatus. Incidentally, unlike in FIG. 11, layers (an upper layer 24A, a lower layer 24B) formed from a material that is different from the material constituting the first high-frequency signal waveguide 20D are formed above and below the first high-frequency signal waveguide 20D. The upper layer 24A is formed from, for example, a polystyrene resin of 1.0 mm in thickness and the lower layer 24B is formed from, for example, an acrylic resin of 1.0 mm in thickness. Incidentally, only the upper layer 24A may be formed or only the lower layer 24B may be formed.

Figure 15:
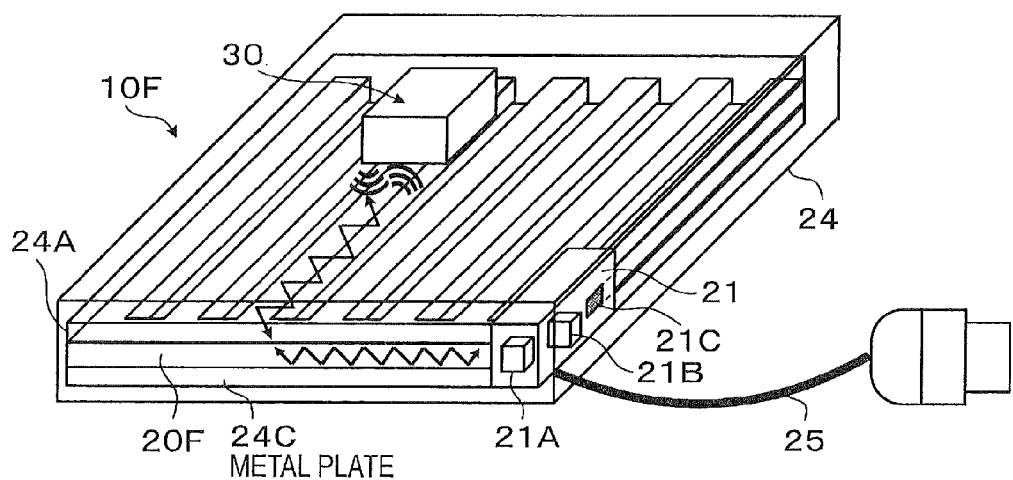
[FIG. 15]

A signal transmission device 10F shown in FIG. 15 is a modification of the signal transmission device 10E shown in FIG. 14 and includes the first communication device 21 similar to one shown in FIG. 10 and the first communication device 21 is connected to a server apparatus. Incidentally, unlike in FIG. 14, a metal plate 24C is arranged below the first high-frequency signal waveguide 20D.

Figure 16:
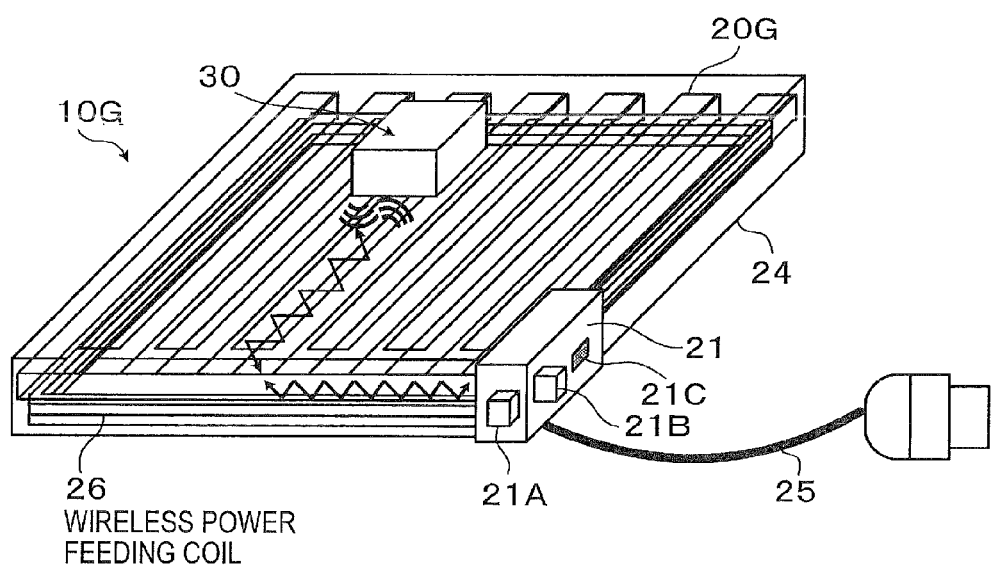
[FIG. 16]

A signal transmission device 10G shown in FIG. 16 is also a modification of the signal transmission device 10B shown in FIG. 11 and includes the first communication device 21 similar to one shown in FIG. 10 and the first communication device 21 is connected to a server apparatus. Incidentally, unlike in FIG. 11, a magnet coil 26 is disposed below the first high-frequency signal waveguide 20D and power is supplied by the electromagnetic induction method or resonance method. Corresponding to the magnet coil, though not shown, a power receiving unit capable of electromagnetic coupling or resonant coupling with the magnet coil 26 is provided in the electronic device 30.

Figure 17:
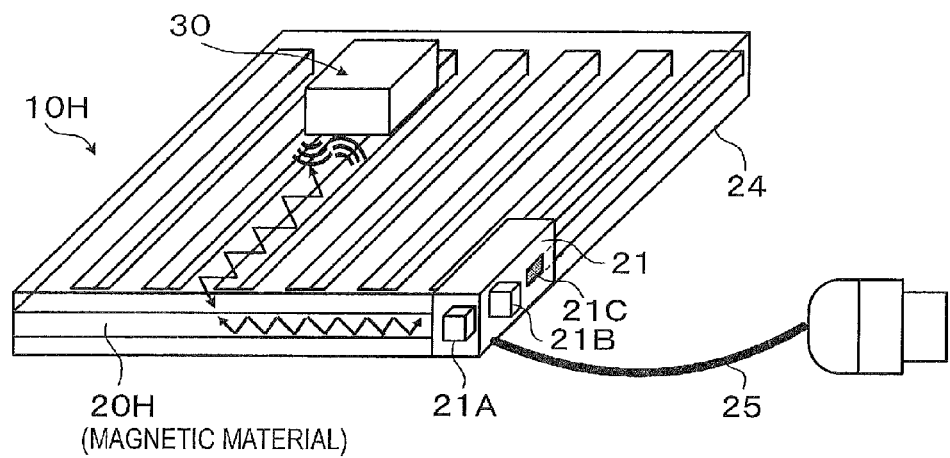
[FIG. 17]

A signal transmission device 10H shown in FIG. 17 is also a modification of the signal transmission device 10B shown in FIG. 11 and includes the first communication device 21 similar to one shown in FIG. 10 and the first communication device 21 is connected to a server apparatus. Incidentally, in contrast to FIG. 11, a first high-frequency signal waveguide 20H is formed from a magnetic material having a comb shape and, more specifically, from, for example, cobalt of 1.0 mm in thickness. However, the material and thickness are not limited to the above examples and the magnetic material constituting the first high-frequency signal waveguide 20B and the thickness thereof may be decided depending on a high-frequency signal. The holding member 24 is formed from a ferritic magnetic material having the thickness of, for example, 1.0 mm and the first high-frequency signal waveguide 20B is arranged inside the holding member 24.

Figure 18:
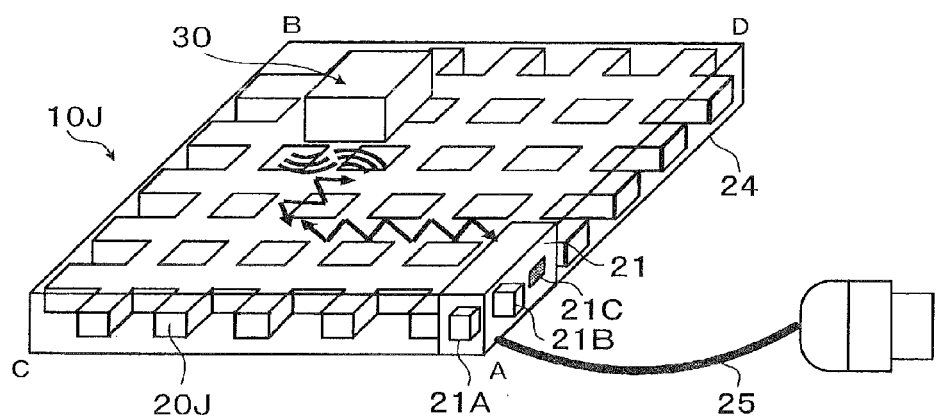
[FIG. 18]

In the example shown in FIG. 18, a first high-frequency signal waveguide 20J in a signal transmission device 10J has a lattice shape. By configuring the first high-frequency signal waveguide 20J in this manner, a plurality of paths is formed between the first communication device 21 and the electronic device 30. Thus, high-frequency signals having taken different paths reach the first communication device 21 with a time difference resulting from a path length difference. Therefore, where in the first high-frequency signal waveguide 20J the electronic device 30 is placed can be detected. If the number of the first communication devices 21 is one, it is difficult to make a sharp distinction between electronic devices in positions with the same path length difference and therefore, it is preferable to arrange a plurality of the first communication devices 21. The first communication device 21 is preferably arranged in another corner portion C or corner portion D, rather than a corner portion B diagonally opposite to a corner A where the first communication device 21 is arranged. By arranging the first communication device 21 in the corner portion C or the corner portion D, the location of the first high-frequency signal waveguide 20J where the electronic device 30 is placed can be detected more reliably by using the principle of triangulation.

Figure 19:
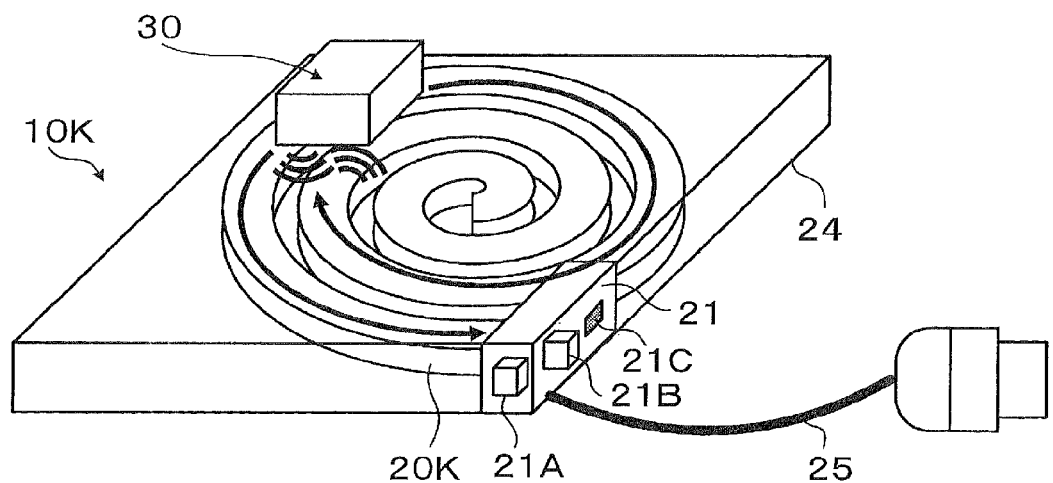
[FIG. 19]

In the example shown in FIG. 19, a first high-frequency signal waveguide 20K in a signal transmission device 10K has a spiral shape. In such a configuration, the number of transmission lines is one and there is no portion where the high-frequency signal waveguide is bent at right angles and therefore, losses decrease and also the influence of multipaths decreases.

Figure 20:
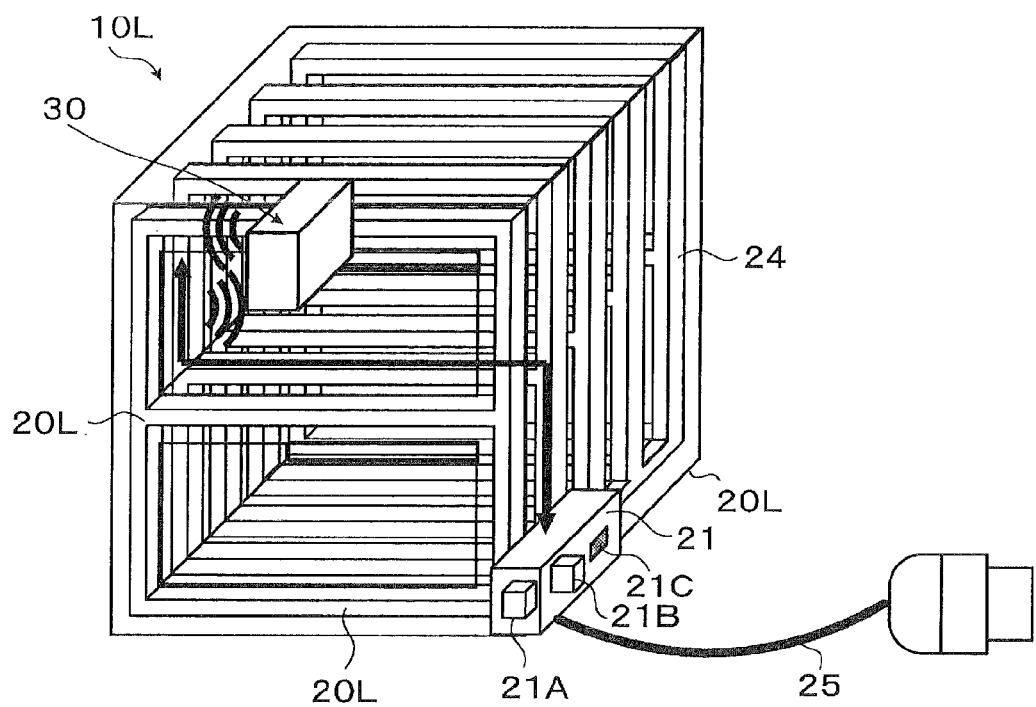
[FIG. 20]

In the example shown in FIG. 20, a plurality of two-dimensional high-frequency signal waveguides 20L constituting a signal transmission device 10L is three-dimensional (cubic) as a whole. That is, the plurality of two-dimensional high-frequency signal waveguides 20L is placed side by side and the plurality of two-dimensional high-frequency signal waveguides 20L is connected by a waveguide. More specifically, each of the two-dimensional first high-frequency signal waveguides 20L has a shape of a Chinese character "日". That is, in the illustrated example, each of the two-dimensional first high-frequency signal waveguides 20L has a plane shape in which three horizontal bars extend in the horizontal direction and both ends of each horizontal bar are each connected to vertical bars. Then, the two-dimensional first high-frequency signal waveguides 20L are connected to each other.

Various first high-frequency signal waveguides described above may be arranged inside the holding member or formed on the holding member, or at least a portion of the high-frequency signal waveguides may be exposed from the holding member.

Figure 21:
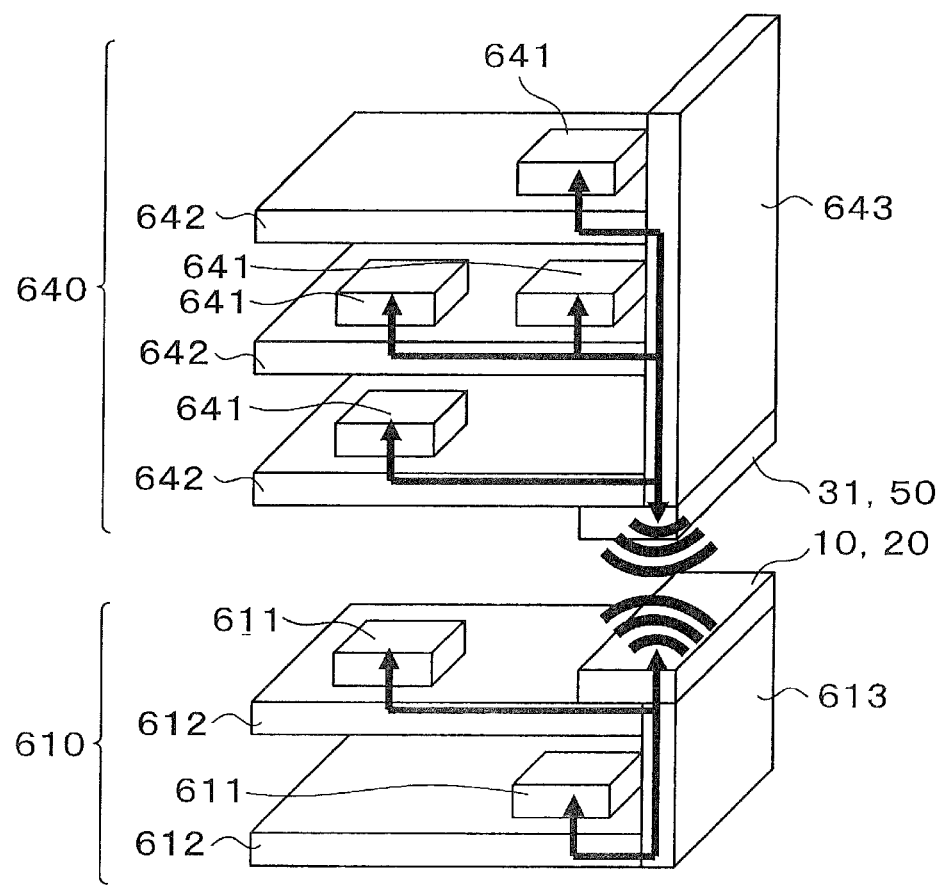
[FIG. 21]

The present disclosure has been described above based on the preferred example, but the present disclosure is not limited to such examples. The configuration, structure, and materials used of signal transmission devices and electronic devices described in examples are by way of example and may be changed when necessary. The electronic device may be a so-called active electronic device as described in examples, but may also be, as will be described below, a so-called passive electronic device. That is, a conceptual diagram of an example in which the electronic device is formed of a multilayer printed wiring board is shown in FIG. 21. In the example shown in FIG. 21, a signal transmission device 610 and an electronic device 640 are formed of a multilayer printed wiring board (two-layer and three-layer printed wiring boards respectively). Semiconductor chips 611, 641 are mounted on printed wiring boards 612, 642 constituting multilayer printed wiring boards respectively. Further, the printed wiring boards 612, 642 are connected by printed wiring boards 613, 643 or through holes respectively. The signal transmission device 10 including the first high-frequency signal waveguide 20 is provided on one surface of the stacked printed wiring board 612. On the other hand, for example, the second high-frequency signal waveguide 50 or the communication means 31 is provided on one surface of the stacked printed wiring board 642.

Additionally, the present disclosure may also be configured as below.

[1] <<Signal Transmission Device>>
  A signal transmission device, including:
  a high-frequency signal waveguide that transmits a high-frequency signal emitted from an electronic device,
  wherein, when the electronic device is arranged close to the high-frequency signal waveguide, the high-frequency signal is transmitted via the high-frequency signal waveguide.
[2] The signal transmission device according to [1], wherein, when a plurality of electronic devices are arranged close to the high-frequency signal waveguide, the high-frequency signal is transmitted between the plurality of electronic devices via the high-frequency signal waveguide.
[3] The signal transmission device according to [1] or [2], further including:
  a communication device connected to or coupled to the high-frequency signal waveguide,
  wherein, when the electronic device is arranged close to the high-frequency signal waveguide, the high-frequency signal is transmitted between the communication device and the electronic device via the high-frequency signal waveguide.
[4] The signal transmission device according to any one of [1] to [3], further including:
  a holding member that holds the high-frequency signal waveguide, wherein the high-frequency signal waveguide is arranged inside the holding member.
[5] The signal transmission device according to any one of [1] to [3], further including:
  a holding member that holds the high-frequency signal waveguide,
  wherein at least a portion of the high-frequency signal waveguide is exposed from the holding member.
[6] The signal transmission device according to any one of [1] to [3], further including:
  a holding member that holds the high-frequency signal waveguide,
  wherein the high-frequency signal waveguide is formed on the holding member.
[7] The signal transmission device according to any one of [1] to [6], wherein the high-frequency signal waveguide has a flat-plate shape.
[8] The signal transmission device according to any one of [1] to [6], wherein the high-frequency signal waveguide has a comb shape.
[9] The signal transmission device according to any one of [1] to [6], wherein the high-frequency signal waveguide has a lattice shape.
[10] The signal transmission device according to any one of [1] to [6], wherein the high-frequency signal waveguide has a spiral shape.
[11] The signal transmission device according to any one of [1] to [10], wherein a layer formed from a material that is different from a material included in the high-frequency signal waveguide is formed above the high-frequency signal waveguide, below the high-frequency signal waveguide, or above and below the high-frequency signal waveguide.
[12] The signal transmission device according to any one of [1] to [12], wherein the high-frequency signal waveguide is formed from a dielectric material.
[13] The signal transmission device according to any one of [1] to [12], wherein the high-frequency signal waveguide is formed from a magnetic material.
[14] The signal transmission device according to any one of [1] to [13], wherein a wavelength of a carrier frequency in the high-frequency signal is greater than or equal to 0.1 mm and less than or equal to 10 cm.

<<Electronic Device>>
  An electronic device, including:
  a communication device; and
  a high-frequency signal waveguide that transmits a high-frequency signal emitted from the communication device,
  wherein, when the high-frequency signal waveguide is arranged close to a high-frequency signal waveguide disposed outside, the high-frequency signal is transmitted from the high-frequency signal waveguide included in the electronic device to the high-frequency signal waveguide disposed outside.
[16] The electronic device according to [15], further including:
  a high-frequency signal transmission member that transmits the high-frequency signal emitted from the communication device to the high-frequency signal waveguide included in the electronic device.

REFERENCE SIGNS LIST 10, 10A, 10B, 10C, 10D, 10E, 10F, 10G, 10H, 10J, 10K, 10L signal transmission device
20, 20A, 20B, 20C, 20D, 20E, 20F, 20G, 20H, 20J, 20K, 20L high-frequency signal waveguide (first high-frequency signal waveguide)
21 communication device (first communication device)
21A transmission/reception circuit unit
21B resonance unit
21C transmission/reception electrode
22 output unit
23 control unit (First control unit)
24 holding member (support member)
24' portion of holding member facing first high-frequency signal waveguide
24A upper layer
24B lower layer
24C metal plate
25 wiring
26 wireless power feeding coil
27 conductive layer
30, 30A, 30B electronic device
30A' digital still camera (electronic device)
30B' portable phone (electronic device)
31 communication means
32 semiconductor chip
34, 44 housing
40, 40A, 40B electronic device of the present disclosure
50 second high-frequency signal waveguide
51 communication device (second communication device)
100 semiconductor chip
101 LSI functional unit
102 transmission line (or a dielectric material piece)
110 transmission unit
111 multiplexing processing unit
112 parallel-to-serial conversion unit
113 modulation unit
114 frequency conversion unit
115 amplification unit
120 reception unit
121 demultiplexing processing unit
122 serial-to-parallel conversion unit
123 demodulation unit
124 frequency conversion unit
125 amplification unit
400 television receiver
401 display unit
402 pedestal
610 signal transmission device (multilayer printed wiring board)
640 electronic device (multilayer printed wiring board)
611, 641 semiconductor chip
612, 613, 642, 643 printed wiring board

The invention claimed is:

1. A signal transmission device, comprising:
a high-frequency signal waveguide configured to transmit in a first direction a high-frequency signal emitted from an electronic device; and
a communication device connected or coupled to the high-frequency signal waveguide,
wherein,
when the electronic device is at least proximate to a surface of the high-frequency signal waveguide, the high-frequency signal is directly coupled in a second direction different than the first direction from the electronic device to the high-frequency signal waveguide and transmitted via the high-frequency signal waveguide to the communication device.

2. The signal transmission device according to claim 1, wherein, when a plurality of electronic devices are at least proximate to the high-frequency signal waveguide, the high-frequency signal is transmitted between the plurality of electronic devices via the high-frequency signal waveguide.

3. The signal transmission device according to claim 1, further comprising a holding member that holds the high-frequency signal waveguide, wherein the high-frequency signal waveguide is arranged inside the holding member.

4. The signal transmission device according to claim 1, further comprising a holding member that holds the high-frequency signal waveguide, wherein at least a portion of the high-frequency signal waveguide is exposed from the holding member.

5. The signal transmission device according to claim 1, further comprising a holding member that holds the high-frequency signal waveguide, wherein the high-frequency signal waveguide is on the holding member.

6. The signal transmission device according to claim 1, wherein the high-frequency signal waveguide has a flat-plate shape.

7. The signal transmission device according to claim 1, wherein the high-frequency signal waveguide has a comb shape.

8. The signal transmission device according to claim 1, wherein the high-frequency signal waveguide has a lattice shape.

9. The signal transmission device according to claim 1, wherein the high-frequency signal waveguide has a spiral shape.

10. The signal transmission device according to claim 1, wherein a layer formed from a material that is different from a material included in the high-frequency signal waveguide is formed above the high-frequency signal waveguide, below the high-frequency signal waveguide, or above and below the high-frequency signal waveguide.

11. The signal transmission device according to claim 1, wherein the high-frequency signal waveguide comprises a dielectric material.

12. The signal transmission device according to claim 1, wherein the high-frequency signal waveguide comprises a magnetic material.

13. The signal transmission device according to claim 1, wherein a wavelength of a carrier frequency in the high-frequency signal is greater than or equal to 0.1 mm and less than or equal to 10 cm.

14. An electronic device, comprising:
a communication device; and
a high-frequency signal waveguide that transmits a high-frequency signal emitted from the communication device,
wherein,
when the high-frequency signal waveguide is at least proximate to a surface of a high-frequency signal waveguide disposed outside of the electronic device, the high-frequency signal is directly coupled from the electronic device to the high-frequency signal waveguide disposed outside of the electronic device,
the high-frequency signal waveguide disposed outside of the electronic device is configured to transmit the high-frequency signal in a first direction, and
the high-frequency signal is directly coupled in a second direction different than the first direction from the electronic device to the high-frequency signal waveguide disposed outside of the electronic device.

15. The electronic device according to claim 14, further comprising a high-frequency signal transmission member that transmits the high-frequency signal emitted from the communication device to the high-frequency signal waveguide included in the electronic device.

16. The signal transmission device of claim 1, wherein when the electronic device is at least proximate to the surface of the high-frequency signal waveguide, the high-frequency waveguide is configured to receive and transmit the high-frequency signal even when the high-frequency waveguide is in a non-contact state with the electronic device.

* * * * *